(12) United States Patent
Swist

(10) Patent No.: US 8,826,459 B2
(45) Date of Patent: Sep. 2, 2014

(54) SYSTEMS AND METHODS OF AUTOMATIC MULTIMEDIA TRANSFER AND PLAYBACK

(76) Inventor: Jason Swist, Edmonton (CA)

( * ) Notice: Subject to any disclaimer, the term of this patent is extended or adjusted under 35 U.S.C. 154(b) by 122 days.

(21) Appl. No.: 13/305,899

(22) Filed: Nov. 29, 2011

(65) Prior Publication Data

US 2013/0138956 A1    May 30, 2013

(51) Int. Cl.
  *G06F 7/04* (2006.01)
  *G06F 17/30* (2006.01)
  *G06F 13/00* (2006.01)
  *G06F 13/28* (2006.01)
  *H04N 7/16* (2011.01)
  *G06F 12/14* (2006.01)
  *G06F 21/10* (2013.01)
  *G11B 20/00* (2006.01)

(52) U.S. Cl.
  CPC ........ *G06F 12/1483* (2013.01); *G06F 12/1458* (2013.01); *G06F 21/105* (2013.01); *G06F 21/10* (2013.01); *G11B 20/00666* (2013.01)
  USPC ................ 726/29; 726/27; 711/163; 711/164

(58) Field of Classification Search
  CPC . G06F 12/14; G06F 12/1458; G06F 12/1483; G06F 12/0246; G06F 3/0679; G11B 20/00086; G11B 20/00666
  USPC ............ 726/1–10, 26–30; 711/100, 115, 154, 711/163, 164, 200, 202, 216, 221
  See application file for complete search history.

(56) References Cited

U.S. PATENT DOCUMENTS

| | | | |
|---|---|---|---|
| 6,920,565 B2 * | 7/2005 | Isaacson et al. | 713/193 |
| 7,505,955 B2 * | 3/2009 | Watanabe et al. | 1/1 |
| 8,429,365 B2 * | 4/2013 | Lin et al. | 711/164 |
| 2002/0034302 A1 * | 3/2002 | Moriai et al. | 380/270 |
| 2002/0095382 A1 * | 7/2002 | Taoka et al. | 705/50 |
| 2002/0116575 A1 * | 8/2002 | Toyomura et al. | 711/115 |
| 2002/0131594 A1 * | 9/2002 | Hori et al. | 380/201 |
| 2002/0138439 A1 * | 9/2002 | Matsushima et al. | 705/52 |
| 2002/0176575 A1 * | 11/2002 | Qawami et al. | 380/201 |
| 2002/0188796 A1 * | 12/2002 | Suzuki | 711/103 |
| 2002/0191764 A1 * | 12/2002 | Hori et al. | 379/200 |
| 2003/0005213 A1 * | 1/2003 | Suzuki | 711/103 |
| 2003/0007640 A1 * | 1/2003 | Harada et al. | 380/270 |
| 2003/0009667 A1 * | 1/2003 | Horiuchi et al. | 713/168 |

(Continued)

FOREIGN PATENT DOCUMENTS

WO    WO 2004070728 A1 *    8/2004    ............... G11C 7/00

*Primary Examiner* — Tae Kim

(74) *Attorney, Agent, or Firm* — Rosenberg, Klein & Lee

(57) ABSTRACT

Digital rights management to protect copyrighted materials is a common element of consumers accessing content for a variety of uses including business and recreational. Such techniques have been generally deployed on small items of multimedia content such as individual tracks of music. However, at present despite the penetration of portable electronic devices for texting, telephony, email, and music their use by consumers for video, film, and large multimedia content has been limited in part due to the issues of downloading and handling individual files of hundreds or thousands of MB. It would therefore be beneficial to provide a means to download large multimedia content files and render these upon a variety of portable electronic devices while allowing the downloaded multimedia content to be securely stored within a portable memory device allowing the user to render the content upon their own electronic devices or other electronic devices without re-distributing the content.

15 Claims, 13 Drawing Sheets

(56) References Cited

U.S. PATENT DOCUMENTS

| | | | |
|---|---|---|---|
| 2003/0050050 A1* | 3/2003 | Higuchi et al. | 455/414 |
| 2004/0078586 A1* | 4/2004 | Sato et al. | 713/193 |
| 2005/0165688 A1* | 7/2005 | Matsushima et al. | 705/52 |
| 2005/0226072 A1* | 10/2005 | Nakabe et al. | 365/222 |
| 2006/0129514 A1* | 6/2006 | Watanabe et al. | 707/1 |
| 2007/0043769 A1* | 2/2007 | Kasahara et al. | 707/104.1 |
| 2007/0081665 A1* | 4/2007 | Kasahara et al. | 380/28 |
| 2007/0198859 A1* | 8/2007 | Harada et al. | 713/193 |
| 2008/0005589 A1* | 1/2008 | Tsukazaki | 713/193 |
| 2008/0022396 A1* | 1/2008 | Kado | 726/19 |
| 2008/0115210 A1* | 5/2008 | Hirota et al. | 726/20 |
| 2008/0195829 A1* | 8/2008 | Wilsey | 711/163 |
| 2010/0115200 A1* | 5/2010 | Papagrigoriou | 711/115 |
| 2010/0332723 A1* | 12/2010 | Lin et al. | 711/100 |

* cited by examiner

SYSTEMS AND METHODS OF AUTOMATIC MULTIMEDIA TRANSFER AND PLAYBACK

FIELD OF THE INVENTION

This invention relates to multimedia content and more specifically to the transfer and playback of multimedia content with increased user portability.

BACKGROUND OF THE INVENTION

In the past 30 years the distribution of music, audio, photographs, video, films has changed faster through more standards than it had in the preceding 100 years. During that time digital media, namely CDs and DVDs, obsoleted analog media, such as vinyl discs and magnetic tape, before being obsoleted themselves with the rapid penetration of the Internet and downloading/streaming of digital data to a variety of portable and fixed electronic devices. Similarly analog radio and television are being replaced with digital formats and user expectations for quality being increased with the release of LED/LCD/Plasma screens and initially increased "lines" to 720 and then 1080 with high-definition (HD) whilst displays increased from typically 20"-36" to 36"-54" and above. At the same time digital media distribution saw rapid rise in piracy and copyright infringement as copying digital content was a rapid and simple process.

Accordingly, many organizations employ digital rights management (DRM) to protect their copyrighted materials although their use is still controversial. Corporations claim that DRM is necessary to fight copyright infringement online and that it can help the copyright holder maintain artistic control or ensure continued revenue streams. Those opposed to DRM argue that there is no evidence that DRM helps prevent copyright infringement and that DRM helps big business stifle innovation and competition. Proponents argue that digital locks should be considered necessary to prevent intellectual property from being stolen, just as physical locks are needed to prevent personal property from being stolen. Some opponents, such as the Free Software Foundation (through its Defective By Design campaign), maintain that the use of the word "rights" is misleading and suggest that people instead use the term digital restrictions management. Their position is essentially that copyright holders are restricting the use of material in ways that are beyond the scope of existing copyright laws, and should not be covered by future laws. In contrast the Electronic Frontier Foundation, and other opponents, also consider the use of DRM systems to be anti-competitive practice but support that the content originator and user need legal protection.

Accordingly, today music downloaded from legitimate retailers such as Apple's iTunes™ store employs DRM to the degree that the content is restricted to a number of electronic devices so that a user may access the content from their smartphone, MP3 player, and laptop computer for example although the content is only downloaded once and must be transferred from one device to another by linking the devices electronically through an application, in the instance of Apple through their iTunes™ software. However, at present the penetration of portable electronic devices for video, film, and large multimedia content has been limited in part due to the issues of downloading and handling between devices individual files of hundreds to thousands of MB rather than a couple of MB per song.

At present multimedia content such as TV shows, films etc is provided through service providers in streamed formats but issues relating to service plans etc prevent users downloading such content to their portable electronic devices such as smartphones, PDAs, cellphones etc as a single Hollywood movie may absorb the users entire monthly data plan.

It would therefore be beneficial to provide users with a means to download large multimedia content files and render these upon a variety of portable electronic devices. It being further beneficial to allow the downloading of multimedia content to be securely stored within a portable memory device allowing the user to render the content with their electronic devices or the electronic devices of others and that such rendering was constrained by digital rights associated with the multimedia content and memory device. It would also be beneficial to allow the user to select their rendering options in terms of duration of their rights for number of renderings or time frame for renderings as well as providing the ability to associate additional content with the multimedia content at the time of rendering or downloading such as sub-titles or elements within the multimedia content.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigating disadvantages of the prior art in respect to multimedia content and more specifically to the transfer and playback of multimedia content by users with high portability.

In accordance with an embodiment of the invention there is provided a method
requesting a credential relating to a right to access multimedia content from a computer system comprising a memory device;
requesting data relating to the memory device from the computer system;
receiving a request relating to multimedia content from the computer system;
accessing the multimedia content on a first computer server storing the multimedia content in dependence upon a determination with respect to the supplied credential;
encrypting the multimedia content in dependence upon at least the data relating to the memory device; and
transferring the multimedia content to the memory device.

In accordance with an embodiment of the invention there is provided a method comprising:
requesting a credential relating to a right to access multimedia content from a first computer system comprising a memory device to a first computer server via a communications network;
transmitting data relating to the memory device from the computer system to the first computer server via the communications network;
transmitting a request relating to multimedia content from the computer system to the first computer server via the communications network;
receiving the multimedia content from a second computer server via the communications network;
receiving rendering rights relating to the multimedia content generated in dependence upon at the least an aspect of the request.
storing the multimedia content and rendering rights within the memory device; and
decrypting the multimedia content in dependence upon a decryption key generated in dependence upon at least the data relating to the memory device and the rendering rights in response to a request to render the multimedia content on at least one of the first computer system and another computer system.

In accordance with an embodiment of the invention there is provided a method comprising:

storing within a memory device an application relating to stored multimedia content;

receiving new multimedia content for storage within the memory device;

storing the new multimedia content within the memory device;

transferring a first mapping of the new multimedia content on the memory device to a computer system; and modifying a second mapping stored within the memory device relating to the new multimedia content to render it incorrect for any access to the multimedia content other than via the application.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to multimedia content and more specifically to the transfer and playback of multimedia content with increased user portability.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "mobile communication device" or "portable electronic device" as used herein and throughout this disclosure, refers to a wireless device used for communication that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader. A "fixed electronic device" as used herein and throughout this disclosure, refers to a wired or wireless device used for communication that requires interconnection to a utility power supply. This includes devices, but is not limited to, such as desktop computers, televisions, cable set-top boxes, satellite set-top boxes, residential electrical appliances, and routers.

"Multimedia content" as used herein may refer to, but is not limited to, text, email, documents, photographs, images, video, movies, computer generated graphics, sounds, music, computer games, and digital content for presentation to a user. A "network operator/service provider" as used herein may refer to, but is not limited to, a telephone or other company that provides services for mobile phone subscribers including voice, text, and Internet; telephone or other company that provides services for subscribers including but not limited to voice, text, Voice-over-IP, and Internet; a telephone, cable or other company that provides wireless access to local area, metropolitan area, and long-haul networks for data, text, Internet, and other traffic or communication sessions; etc.

Figure 1:
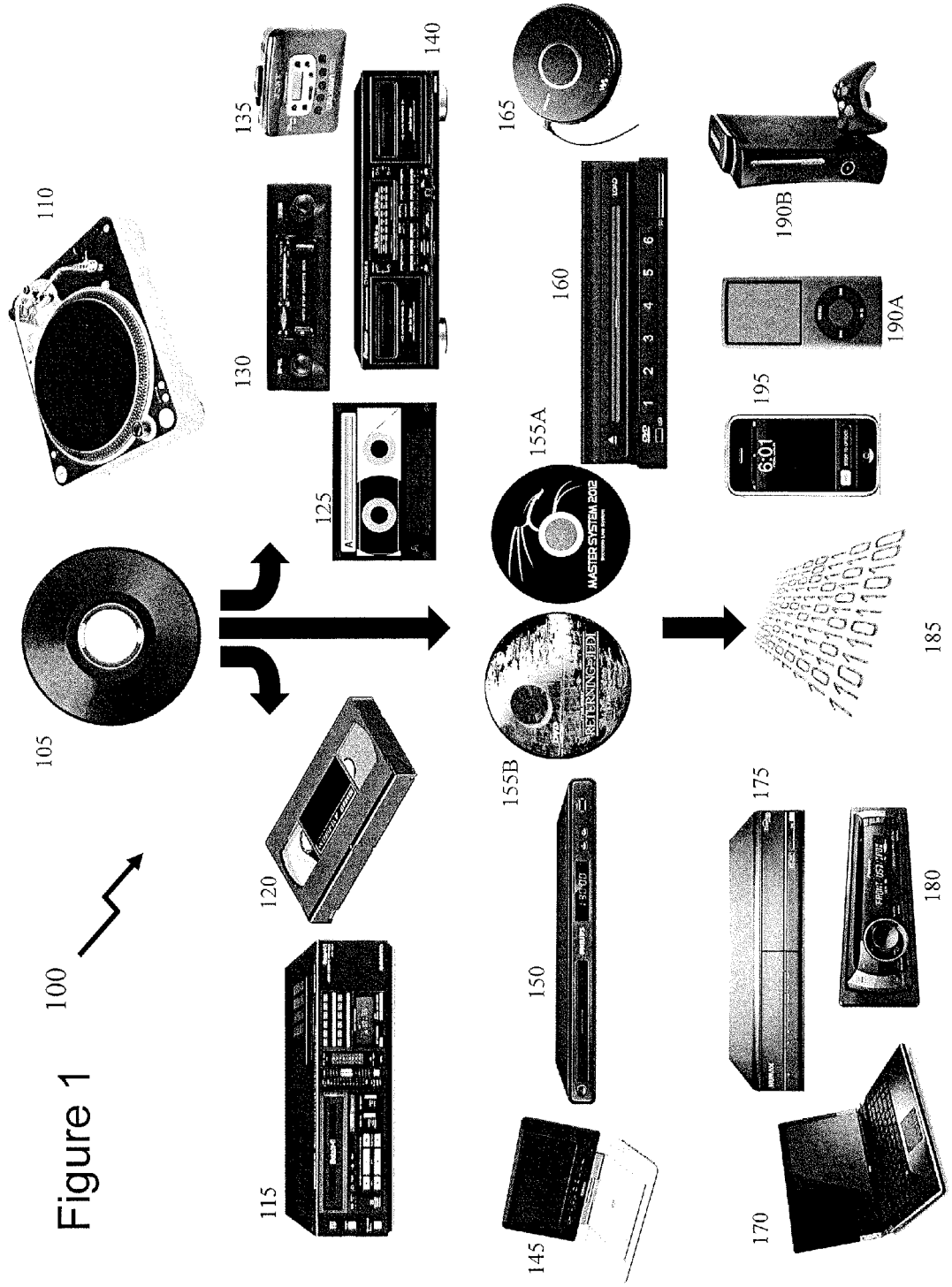
FIG. 1 depicts a different media distribution formats and their associated equipment for playback.

Now referring to FIG. 1 there is depicted a historical view 100 of physical multimedia according to the prior art for approximately the past 50 years. The historical view 100 begins with gramophone record 100, commonly referred to as a vinyl record, and turntable 110 which represented the means of distributing audio content from their initial production in the 1890s but were limited to fixed locations. Subsequently in the early 1960s compact audio cassettes 125 were introduced which could be played in a variety of players included fixed player 140, automobile player 130 and portable player 135. It was not until the mid-1970s with the introduction of Betamax and VHS tapes 120, each being a consumer-level analog videocassette magnetic tape solution for the presentation of audiovisual content through a fixed video player 115.

Subsequently, the audio compact disc 155A, commonly referred to as a CD, was released in 1982 and rapidly established itself as the dominant audio media form. The logical format of an audio CD, officially Compact Disc Digital Audio or CD-DA, was digital for the first time using two-channel 16-bit PCM encoding at a 44.1 kHz sampling rate per channel. The CD 155A rapidly replaced the compact audio cassette in fixed and portable locations including, for example, automobile CD player 160 and portable CD player 165. In 1998 the digital versatile disk 155A, commonly referred to as a DVD, was released generally providing increased storage capacity and read-write speeds through the use of a 650 nm wavelength laser diode light source as opposed to 780 nm for CD. This permits a smaller pit to be etched on the media surface compared to CDs (0.74 µm for DVD versus 1.6 µm for CD), allowing in part for DVD's increased storage capacity of 4.7 GB for a single-sided, single-layer format versus approximately 700 MB for a CD. Subsequent extensions through standards such as DVD+R (single layer read only), DVD+R DL (dual layer read only), DVD+RW DL (dual layer read-write) as well as dual sided disks increased capacities further to 8.5-8.7 GB (single-sided double-layer), 9.4 GB (double-sided, single-layer) and 17.08 GB (double-sided, double-layer).

More recently, the Blu-ray Disc, essentially the successor to the DVD format, uses a wavelength of 405 nm, and one dual-layer disc has a 50 GB storage capacity allowing the Blu-ray Disc to contain not only the audiovisual content but additional associated content including for example games, interviews, out-takes, alternate endings, multiple languages, and support for all display formats including high definition 1080p for example. DVD 155A and Blu-Ray disc being played on fixed players 150 and portable players 145. The evolution of audio and video with CD 155A and DVD 155B led to the rapid obsolescence of analog consumer formats and their replacement with digital storage formats.

However, the inexorable evolution in digital memory, in terms of increased capacity and reduced cost for both semiconductor dynamic random access memory (DRAM) devices and physical hard disc drive (HDD) formats, coupled with the widespread access to high-speed Internet led in the late 2000s to their corresponding rapid demise and accordingly to the rapid demise in the use of physical media distribution for audio content, e.g. music, and video content, e.g. video. As a result digital downloads 185 from a wide variety of sources including legitimate sources such as for example new entrants Apple iTunes™ together with existing retail outlets such as HMV and illegal sources such as Napster have become ubiquitous. Such downloads being initially to, and subsequently from, a variety of devices including smartphones 195, MP3 player 190A, gaming console 190B, automobile MP3 player 180, laptop computer 170, and personal video recorders 175 (PVR).

At present, devices such as smart phones 195 and MP3 players 190A are generally used to download digital downloads 185 such as audio content such as MP3 files either directly or to other devices such as laptop computer 170 as well as short duration audiovisual content. Longer duration multimedia content is typically downloaded through digital download 185 to devices such as PVR 175 and laptop computer 170 wherein the user may access higher speed digital services through their cable service provider or residential telephone service provider rather than through their mobile service provider. Recently Netflix™ began providing on-demand Internet streaming of multimedia content to redirect its business from its original flat rate DVD-by-mail service thereby placing it in competition with video-on-demand services from telecommunications service providers such as AT&T, Rogers, Shaw, Cox Communications, Time Warner, and Comcast.

However, as will be explained below such on-demand services for High Definition (HD) multimedia presentation, such as commonly known as 1080p which is the shorthand identification for a set of HDTV high-definition video modes that are characterized by 1080 horizontal lines of vertical resolution and progressive scan, meaning the image is not interlaced as is the case with the 1080i display standard, consume significant memory with effective memory capacity requirements. For example the MPEG-4 AVC/H.264 (AVC) standard which supports a variety of standard, high definition, and stereoscopic (3D) video resolutions consumes approximately 1 MB per second uncompressed. MPEG-4 also supports audio compression; Dolby AC-3 (Dolby Digital) and uncompressed linear PCM audio, and stereo and multichannel surround sound are both supported. Accordingly, an hour of MPEG-4 uncompressed multimedia data requires approximately 3.6 GB of data to be stored, which according to the Federal Communications Commission report "Broadband Performance" (OBI Technical Paper No. 4, 2009 that established a median download speed of 3 Mb/s for consumers in 2009), would take 160 minutes to download. Typical cable TV compression for a 90-120 minute movie results in the data requirement being reduced to approximately 700 MB corresponding to approximately 30 minutes at 3 Mb/s.

Accordingly, at present "On-Demand" services from cable, telephone, and satellite service providers such as movie rentals and programmed television show access in conjunction with Netflix movie rentals are supported by current median download speeds where the subscriber has purchased high-speed residential Internet service plans which as can be seen from Table 1 below vary in cost, monthly usage and maximum speed (Rogers, Canada). However, mobile data plans are substantially different as evident from Table 2 below wherein cost, monthly usage and excess data fees are listed for different plans (Rogers, Canada) associated with user's portable telephones and smartphones. Table 3 lists the data plans for a subscriber (Rogers, Canada) for accessing the Internet using a 4G wireless modem for their laptop etc.

TABLE 1

Cable Service Provider Internet Service Plans

| Plan | Maximum Download Speed (Mb/s) | Upload Speed (Mb/s) | Additional Usage Fee ($/GB) | Monthly Usage (GB) | Monthly Fee |
|---|---|---|---|---|---|
| Ultra-Lite | 0.5 | 0.256 | 5 | 2 | $27.99 |
| Lite | 3 | 0.256 | 4 | 15 | $35.99 |
| Express | 12 | 0.512 | 2 | 60 | $46.99 |
| Extreme | 24 | 1 | 1.5 | 100 | $59.99 |
| Extreme Plus | 32 | 1 | 1.25 | 150 | $69.99 |
| Ultimate | 50 | 2 | 0.50 | 250 | $99.99 |

TABLE 2

Wireless Provider Service Plans with Data

| Plan | Minutes | Monthly Fee | Data Limit | Excess Data Fee |
|---|---|---|---|---|
| WireA | 150 | $42.35 | | |
| WireB | 200 | $47.35 | 100 MB | $5/100 MB |
| WireC | 200 | $52.35 | 500 MB | $5/500 MB |
| WireD | 200 | $57.35 | 1 GB | |
| WireE | 200 | $62.35 | 2 GB | $10/1 GB |
| WireF | 300 | $67.35 | 1 GB | |
| WireG | 500 | $72.35 | 1 GB | $5/500 MB |

TABLE 3

4G Internet Data Wireless Provider Service Plans

| Plan | Monthly Usage (GB) | Additional Usage Fee ($/GB) | Monthly Fee |
|---|---|---|---|
| 4GA | 0.5 | 50 | $31.93 |
| 4GB | 1.0 | 50 | $36.93 |
| 4GC | 2.0 | 50 | $51.93 |
| 4GD | 5.0 | 50 | $66.93 |

Accordingly it is evident that a user wishing to download a couple of movies of 700 MB per month would essentially consume the monthly usage on most lower cost data plans on their mobile device thereby limiting them to viewing such content in combination with their residential Internet service plan or risk incurring significant financial costs. Accordingly whilst On-Demand and Netflix type services provide users with the ability to view audiovisual content at home these services limit the usage by users on mobile devices. They also require at present the user to take the higher monthly fee plans to try and mitigate their data usage, monitor their usage to avoid costly mistakes, and ensure they are aware of the size of the file being downloaded.

Figure 2:
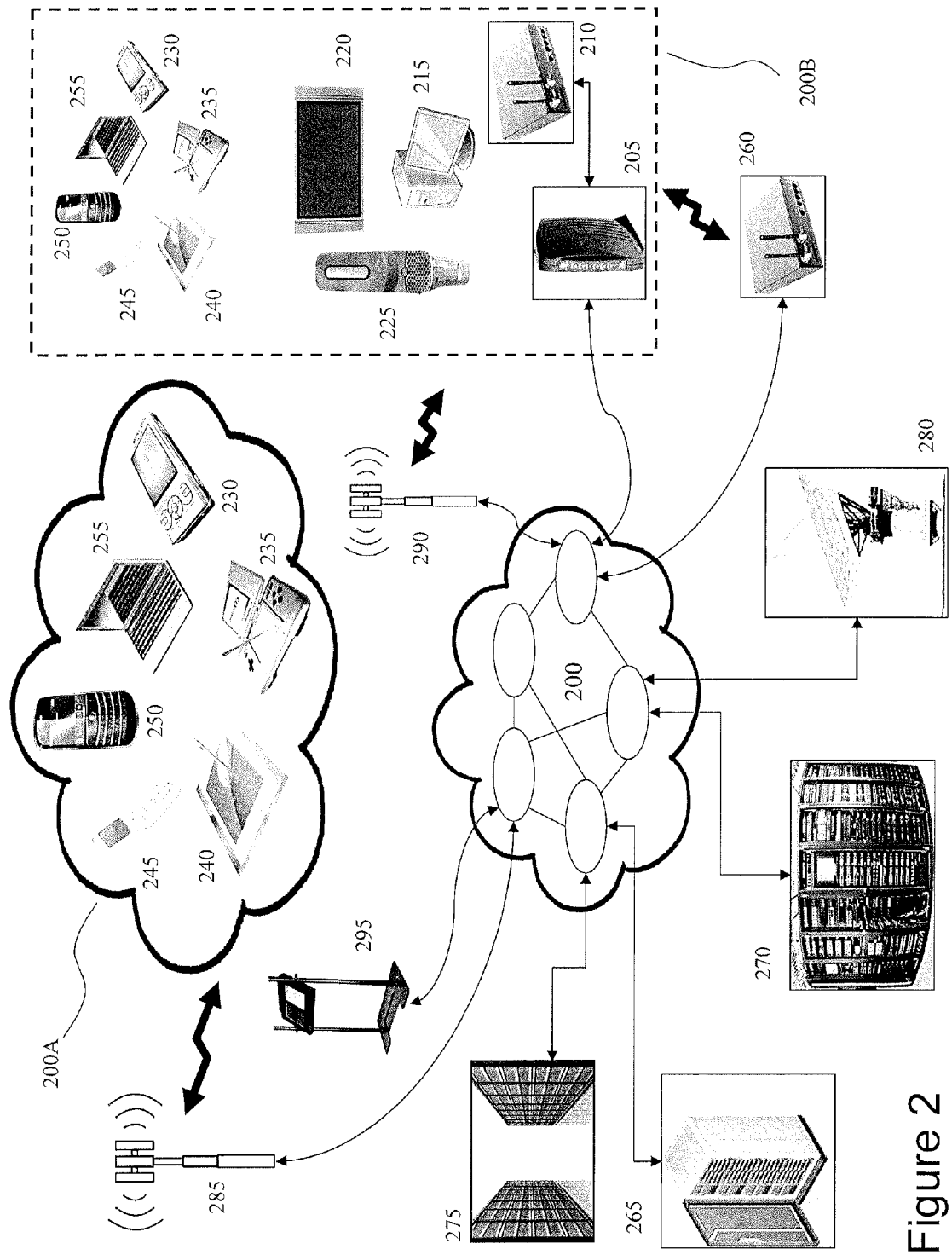
FIG. 2 depicts a network for accessing and downloading multimedia content according to an embodiment of the invention.

Referring to FIG. 2 there is depicted a representative telecommunication architecture wherein a central exchange 270 communicates with the remainder of a telecommunication service providers network via a network 200 which may include for example long-haul OC-48/OC-192 backbone elements, an OC-48 wide area network (WAN), a Passive Optical Network, and a Wireless Link. The central exchange 280 is connected via the network 200 to a local exchange 275 and therein through network 200 via a modem 205 to a wireless access point (AP) 210 which provides a Wi-Fi cell for house 200B. Within the Wi-Fi cell associated with first AP 210 occupants of house 220B may employ a variety of portable electronic devices including for example, laptop computer 255, portable gaming console 235, tablet computer 240, cellphone 245, portable multimedia player 230, and smartphone 255 as well as fixed electronic devices such as personal computer (PC) 215, television 220, and gaming console 225. Devices within house 200B may also access the Internet through Wi-Fi spot 260 if they are within range and the Wi-Fi spot 260 allows them access. In some instances modem 205 may be one of several network interfaces to network 200 which may include additional wired or wireless modems within specific equipment as well as satellite and cable set-top boxes which have not been shown for clarity.

Also connected to the network 200 is satellite ground station 280 which provides additional content to the network 200 and therein through direct or indirect access this content is provided to the users interfaced to the network 200. Similarly connected to network 200 are first and second cell towers 285 and 290 respectively. Second cell tower 290 provides cellular service coverage over a predetermined area for devices supporting the communications standard of the cell tower 290 and in this instance the coverage covers house 200B. First cell tower 285 provides cellular service coverage over a different predetermined area for devices supporting the communications standard of the cell tower 285, such as GSM (Global System for Mobile Communications) for example, including smartphone 250, tablet computer 240, cellphone 245, laptop computer 255, portable gaming console 235, and portable multimedia player 230 allowing users to access a variety of services including for example voice, SMS, audiovisual, and Internet browsing according to the specific device. Also connected to network 200 is a kiosk 295 as will be discussed below in respect of embodiments of the invention but may access content being streamed from service providers or stored by service providers including but not limited audio, video, audiovisual and multimedia data from cable service providers, satellite service providers, telecommunications service providers, websites, and Internet service providers.

Some Portable Electronic Devices (PEDs) and Fixed Electronic Devices (FEDs) it would be evident to one skilled in the art may support multiple wired and wireless protocols simultaneously, such that for example a user may employ GSM services such as telephony and SMS and Wi-Fi/WiMAX data transmission, VOIP and Internet access. Accordingly users of PEDs and FEDs are typically able to access the Internet and all products, services, etc which may be provided by one or more telecommunications standards including but not limited to IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000.

Figure 3:
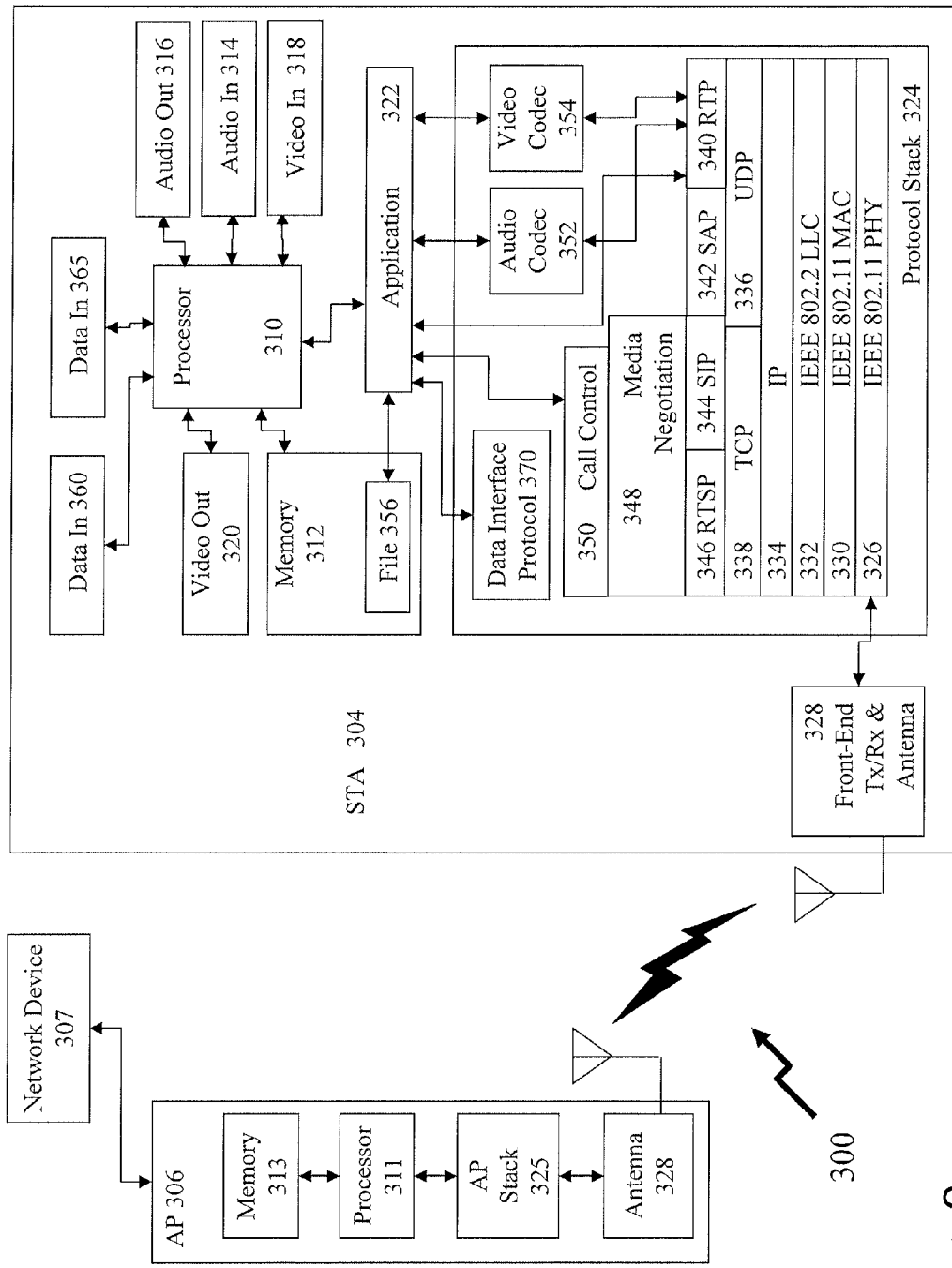
FIG. 3 depicts the structure of a portable electronic device and wireless access point for accessing, downloading, and rendering multimedia content according to an embodiment of the invention.

Referring to FIG. 3 there is depicted the protocol architecture of a representative portable electronic device as part of a simplified functional diagram of a system 300 that includes a portable electronic device (PED) 304, such as a smartphone 250, an access point (AP) 306, such as Wi-Fi AP 210, and one or more network devices 307, such as communication servers, streaming media servers, and routers for example. Network devices 307 may be coupled to AP 306 via any combination of networks, wired, wireless and/or optical communication links including but not limited to those supporting to IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000 communications standards as well as proprietary standards. The PED 304 includes one or more processors 310 and a memory 312 coupled to processor(s) 310. AP 306 also includes one or more processors 311 and a memory 313 coupled to processor(s) 311. A non-exhaustive list of examples for any of processors 310 and 311 includes a central processing unit (CPU), a digital signal processor (DSP), a reduced instruction set computer (RISC), a complex instruction set computer (CISC) and the like. Furthermore, any of processors 310 and 311 may be part of application specific integrated circuits (ASICs) or may be a part of application specific standard products (ASSPs). A non-exhaustive list of examples for memories 312 and 313 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

PED 304 may include an audio input element 314, for example a microphone, and an audio output element 316, for example, a speaker, coupled to any of processors 310. PED 304 may include a video input element 318, for example, a video camera, and a video output element 320, for example an LCD display, coupled to any of processors 310. PED 304 includes one or more software applications 322 that are typically stored in memory 312 and are executable by any combination of processors 310. PED 304 includes a protocol stack 324 and AP 306 includes a communication stack 325. Within system 300 protocol stack 324 is shown as IEEE 802.11 protocol stack but alternatively may exploit other protocol stacks such as an Internet Engineering Task Force (IETF) multimedia protocol stack for example. Likewise AP stack 325 exploits a protocol stack but is not expanded for clarity. Elements of protocol stack 324 and AP stack 325 may be implemented in any combination of software, firmware and/ or hardware. Protocol stack 324 includes an IEEE 802.11- compatible PHY module 326 that is coupled to one or more Front-End Tx/Rx & Antenna 328, an IEEE 802.11-compatible MAC module 330 coupled to an IEEE 802.2-compatible LLC module 332. Protocol stack 324 includes a network layer IP module 334, a transport layer User Datagram Protocol (UDP) module 336 and a transport layer Transmission Control Protocol (TCP) module 338.

Protocol stack 324 also includes a session layer Real Time Transport Protocol (RTP) module 340, a Session Announcement Protocol (SAP) module 342, a Session Initiation Protocol (SIP) module 344 and a Real Time Streaming Protocol (RTSP) module 346. Protocol stack 324 includes a presentation layer media negotiation module 348, a call control module 350, one or more audio codecs 352 and one or more video codecs 354. Software applications 322 may be able to create maintain and/or terminate communication sessions with any of devices 307 by way of AP 306. Typically, software applications 322 may activate any of the SAP, SIP, RTSP, media negotiation and call control modules for that purpose. Typically, information may propagate from the SAP, SIP, RTSP, media negotiation and call control modules to PHY module 326 through TCP module 338, IP module 334, LLC module 332 and MAC module 330.

It would be apparent to one skilled in the art that elements of the PED 304 may also be implemented within the AP 306 including but not limited to one or more elements of the protocol stack 324, including for example an IEEE 802.11-compatible PHY module, an IEEE 802.11-compatible MAC module, and an IEEE 802.2-compatible LLC module 332. The AP 306 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module.

As depicted PED 304 also comprises a data output element 365 and a data input element 360, each of which is also connected to the processor 310 wherein the protocol information for these interfaces is stored within a data interface protocol element 370 stored within the protocol stack 324. Examples of data input and output elements include but are not limited Universal Serial Bus (USB) interfaces of Type A, Type B, Mini-A, Mini-B, Micro-A, and Micro-B, Serial ATA, RS-232, RS-422, I2C, and EIA-485.

Figure 4:
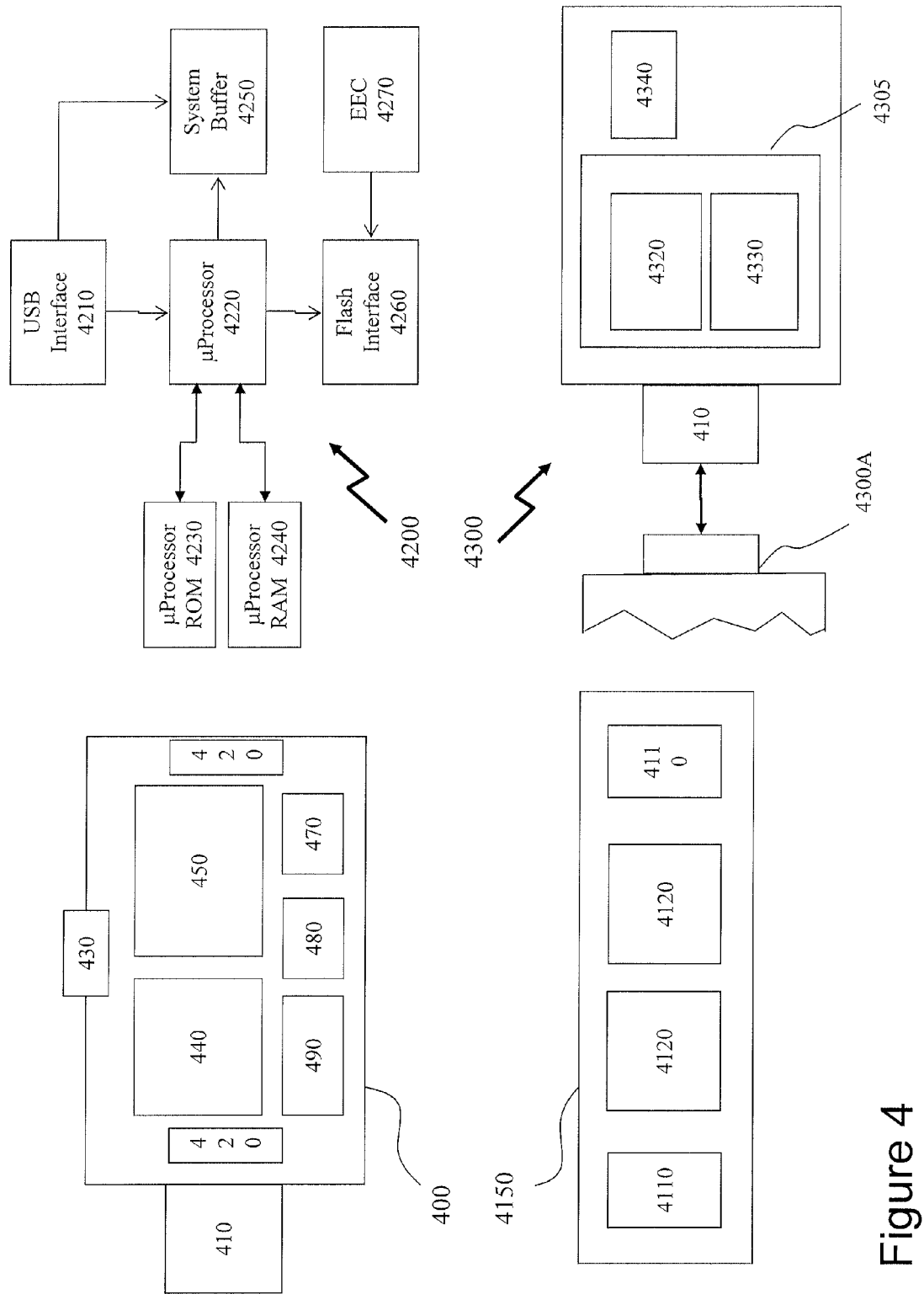
FIG. 4 depicts a memory device for storing multimedia content according to an embodiment of the invention.

Referring to FIG. 4 there is shown a PCB layout block diagram of a flash memory storage device 400 utilizing a USB interface according to an embodiment of the present invention and PCB layout block diagram of a slave board 4150 of the flash memory storage device 400. The main board of the flash memory storage device comprises a controller 440 and at least one flash memory chip 450. A USB connector 410 connects the flash memory storage device 400 with a USB host (not shown). The flash memory on the main board comprises at least one flash memory chip 450 but as described below, the memory capacity of the flash memory device 400 can be easily expanded according to the design of the main board so that multiple flash memory chips 450 can be integrated into the flash memory storage device 400. Typical configurations available today include 8 GB, 16 GB, 32 GB, and 64 GB.

In some embodiments the flash memory storage device 400 may further comprise an extension stack connector 420 that allows for extending the number of flash memories with slave flash memories 4120 on slave boards 4150. The extension stack connector 420 connects the pins needed by the flash memory 4120 on the slave board 4150 with the controller 440 on the main board of the flash memory storage device 400. In this way, the memory capacity of the flash memory device 400 can be conveniently expanded as required to provide multiple capacity flash memories within one common housing configuration. Alternatively the main PCB board of the flash memory storage device 400 may be provided with multiple landing zones for flash memory chips 450 allowing them to be reflow soldered into place directly within requiring the use of slave board 4150. The exact methodology depending upon cost—yield tradeoffs according to the capacity of flash memory chip 450 etc.

The controller 440 is a major component of the device as it controls commands and data between the USB host and manages data in the flash memory array or module comprising flash memory chip(s) 450 and optionally slave board(s) 4150. It some embodiments the controller 440 is of a single chip design so that it does not need external ROM or RAM. A regulator 490 regulates the voltage for the memory storage device 400 which is typically, for flash memory, 3.3 volts or 5.0 volts. Some flash memory devices utilize means of switching between 3.3 volts and 5.0 volts as required by the flash memory for read/write processes. A clock generator 480, for example a crystal, generates a clock signal for the controller 440 of the flash memory device 440 and an indicator 470, for example an LED indicator, indicates the status of the flash memory storage device 400 such as whether it is busy or in standby.

The main board of the flash memory storage device 400 can also have a stack connector 420 for connecting a slave board 4150 to the main board for extending the memory size with additional flash memory 4120. The slave board 4150 comprises at least one additional flash memory array or module 4120 and connectors 4110. Multiple slave boards 4150 can be connected in order to provide unlimited memory expansion according to some embodiments of the invention. A write protection switch 430 provides write protection from the USB host for the flash memory device 400. The switch 430 has at least two positions; a position for allowing the host to read and write normally, and another position for write protection. When the switch 430 is in the write protect position, the host can read data but cannot write or erase data.

Also shown within FIG. 4 is presented a schematic of a controller 4200 of a flash memory storage device 400 to performs the numerous functions, including controlling the USB interface 4210. The controller 4200 follows the USB specification for physical and logical protocol and further comprises a system buffer 4250 or FIFO controller buffer. The controller 4200 receives command and parameter packets from the USB host, which are then stored in the system buffer 4250 defined by the controller 4200. The controller 4200 is also responsible for controlling the transfer of data to and from the USB host and provides status data to the USB host of the flash memory device of which the controller 4200 forms part.

When the host sends a write command, an interrupt is generated and sent to the controller microprocessor 4220 to inform the microprocessor 4220 of the command and the command location. The microprocessor 4220, for example an 8 or 16-bit microprocessor, is a major component of the controller 4200 which reads the USB commands and parameters from the system buffer 4250. The microprocessor 4220 also executes the commands with the received parameters. Microprocessor 4220 also manages and maps the USB FIFO address to the controller system buffer 4250 while receiving or transferring data to and from the USB host.

The microprocessor 4220 manages commands such as erase, program, or read for the flash memory array. In addition, the microprocessor 4220 executes the addressing method according to the algorithm of the controller 4200. Microprocessor ROM 4230 stores the program code of the controller 4200 and is in many instances built into the controller 4200. Microprocessor RAM 4240 is a system RAM used by the controller 4200 when executing USB commands or the flash algorithm. The system buffer 4250 is used as a cache which is provided for buffering between the USB interface 4210 and the flash memory array interface 4260. It is also the FIFO of the USB protocol and the direction map to the buffer. The microprocessor 4220 manages the addresses of this buffer. As required, the buffer can be accessed by byte or word.

The flash memory storage device 400 further comprises a hardware state machine for creating the read and write timing to the system buffer 4250 between the USB host and the flash memory. The flash interface 4260 and circuit, controls the read and write commands to the flash memory array. In an embodiment of the present invention this is a pure hardware circuit. An ECC circuit 4270 encodes the ECC code while data is writing to the flash memory array from the buffer cache and decodes the ECC code while data is read from the flash memory array to the buffer cache. If an ECC error occurs, the ECC circuit 4270 will determine the word or byte address in the buffer cache and correct the error.

Also shown in FIG. 4 is a block diagram of the system architecture 4300 of a flash memory storage device 400. Certain operating systems of the USB host 300 such as Windows ME and Windows 2000 contain default USB device drivers but other operating systems may require the need for a USB device driver to be installed on the host 4300A which may be stored within the flash memory storage device 400. The USB command implementation 4320 comprises the controller 4305 receiving commands and parameters from the USB host 4300A via the USB connector 4310 and storing them in a register defined by the controller. An interrupt is generated and sent to inform the microprocessor that a command has been received. The controller 4305 receives and transfers data to and from the USB host 4300A according to the USB logical and physical specification. The addressing method 4330 comprises managing the flash memory 4340 erase, read, and write commands and manages the physical to logical mapping.

Figure 5:
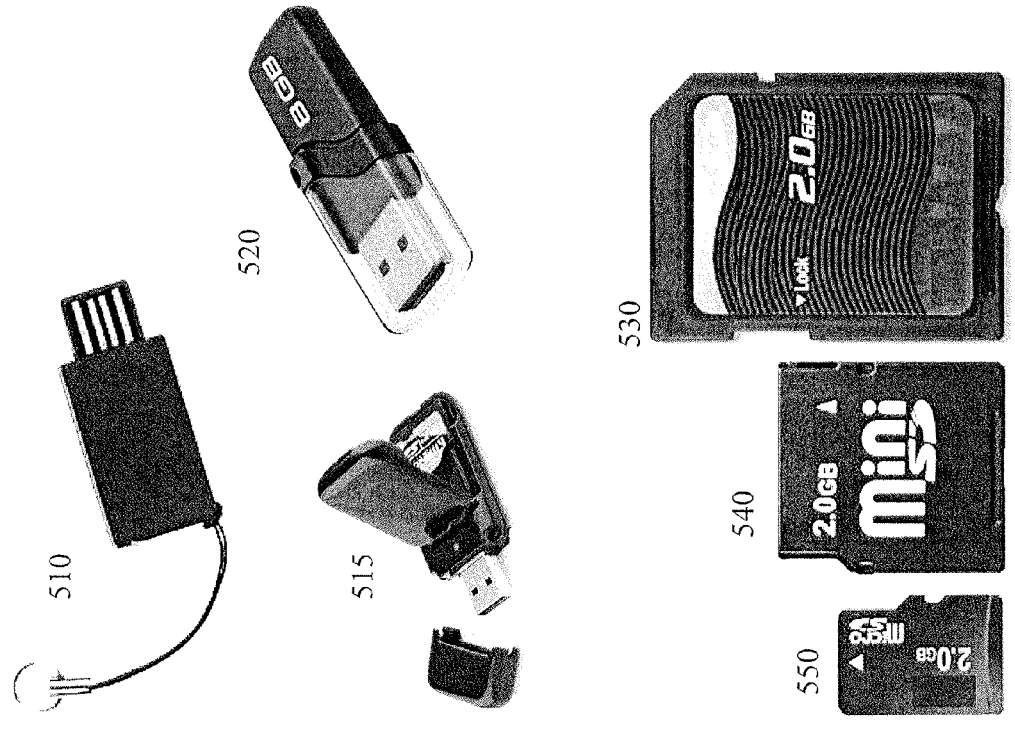
FIG. 5 depicts a memory device and memory device formats for storing multimedia content according to an embodiment of the invention.
Figure 5:
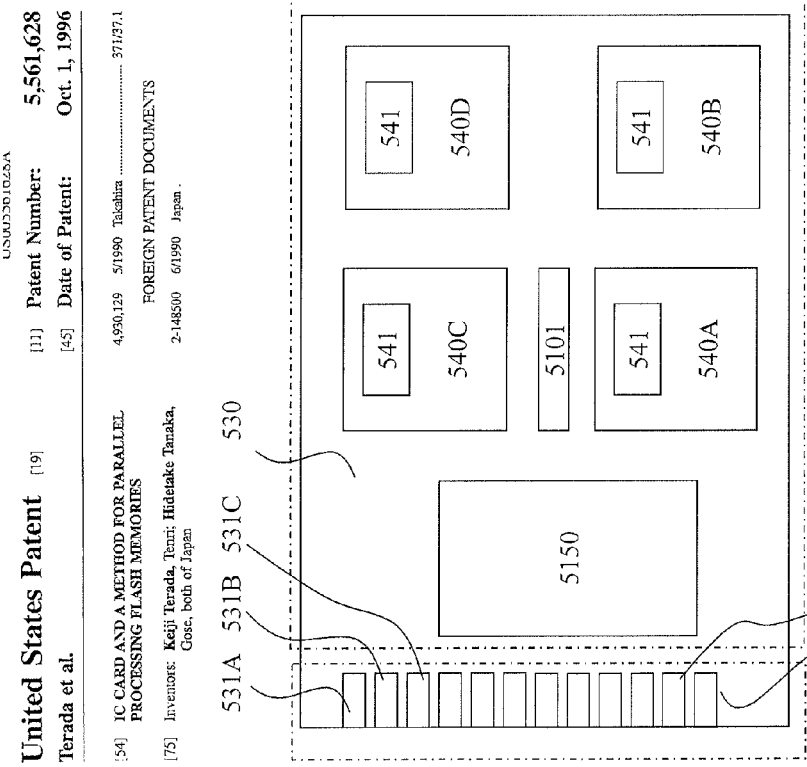

Now referring to FIG. 5 there is a plan view showing a configuration for an IC card 500 which is a memory card or an I/O card pursuant to the JEIDA (Japan Electronics Industry Development Association) standard and PCMCIA (Personal Computer Memory Card International Association) standard, and is often referred to as a "SD card". The IC card (hereinafter also referred to as the "SD card") 500 includes signal processing devices and/or storage devices mounted on a card substrate 530 such as a printed circuit board, and a card connector portion 520 attached on one end of the card substrate 530. The entire card substrate 530 is sealed with a packaging member 510A such as a resin for example. As a signal processing device the IC card 500 includes a card interface 5150 for processing a plurality of input signals and output signals is mounted on the card substrate 530 and a plurality of flash memories 540A through 540D respectively which are mounted on the card substrate 530.

Each of the flash memories 540A to 540D includes a status register 541A through 541D respectively in which values of registers, for example SR.0 to SR.7 corresponding to bits 0 to 7 respectively, vary depending on the operation state of the memory. The data stored within each of the status registers 541A through 541D can be read to the outside of the IC card 500 via a data bus for transmitting data signals D0 to D15 on IC pins 531A through 531L respectively. A signal input pad 5101 is provided on the card substrate 530 of the IC card 500 which is employed for inputting a predetermined signal to the card interface 5150 in a writing test or an erasing test for example. The position of the signal input pad 5101 can be anywhere on the card substrate 530.

Also shown in FIG. 5 are examples of USB memory devices including for example micro-USB 510 employing a micro-USB interface, a USB memory stick 520 and a USB-SD interface 515 for interfacing an SD card, such as IC card 500, via a USB port rather than an SD card interface. Also depicted are standard SD card 530, mini SD card 540 and micro SD card which like USB devices as described above range currently in capacity from 4 MB up to 64 MB.

Figure 6:
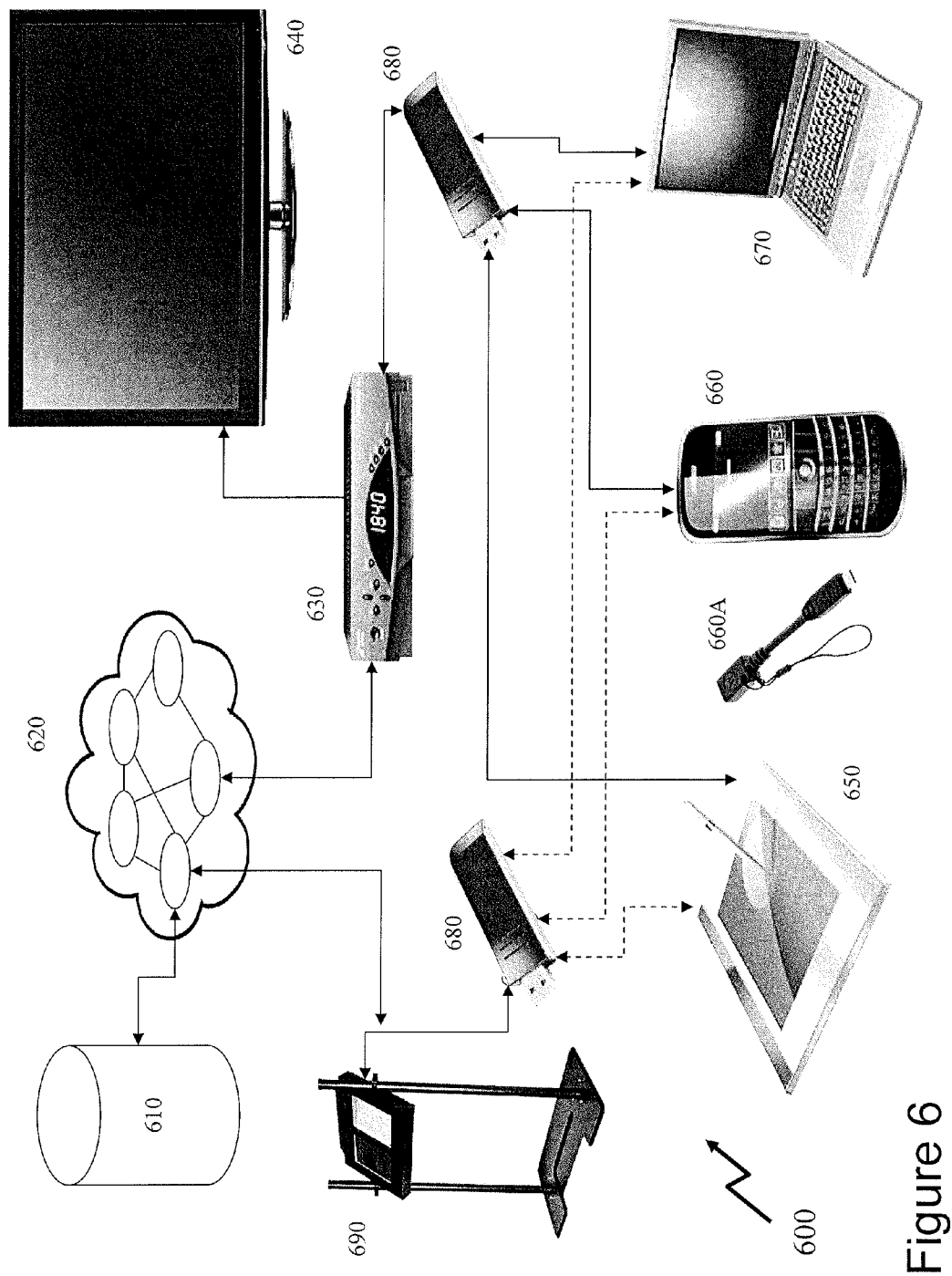
FIG. 6 depicts a downloading and rendering system for multimedia content according to an embodiment of the invention.

Referring to FIG. 6 there is depicted a schematic of a multimedia content system 600 according to an embodiment of the invention. It would be evident to one skilled in the art that multimedia content system 600 exploits predetermined portions of the representative telecommunication architecture presented above in respect of FIG. 2. Accordingly a server 610 is shown which contains multimedia content for distribution to a consumer, not shown for clarity, provides multimedia content to a kiosk 690 or a set-top box 630 via network 620 according to whether the user is downloading the multimedia content to their memory device 680 at the kiosk 690 or set-top box 630. In the instance the user downloads via a set-top box 630 then the user may be guided through associated log-in, selection, and verification processes via on-screen prompts on a screen 640 associated with the set-top box 630 wherein the screen for such user interfacing is provided as part of the kiosk 690.

Accordingly, the media management system through the set-top box 630 or kiosk 690 manages the download to the user's memory device 680 of the selected multi-media content. In doing so the media management system establishes within the memory device 680 in conjunction with the multimedia content additional information relating to the user rights to the multimedia content. Such rights being established for example in response to the user's selections within the navigation provided to them through the media management system. For example the user may purchase limited rights in respect of a number of viewings, a time for viewing absent restrictions on number of plays, or an open license. Once complete the user may then transfer the memory device 680 to one or more PEDs or FEDs including for example tablet computer 650, smartphone 660, and laptop 670 wherein the multimedia content may be retrieved through a media management application installed upon the memory device 680. In some instances, such as smartphone 660, the memory device 680 may require an interface 660A to connect the memory device 680 to the device upon which the multimedia content is being presented to the user.

Figure 7:
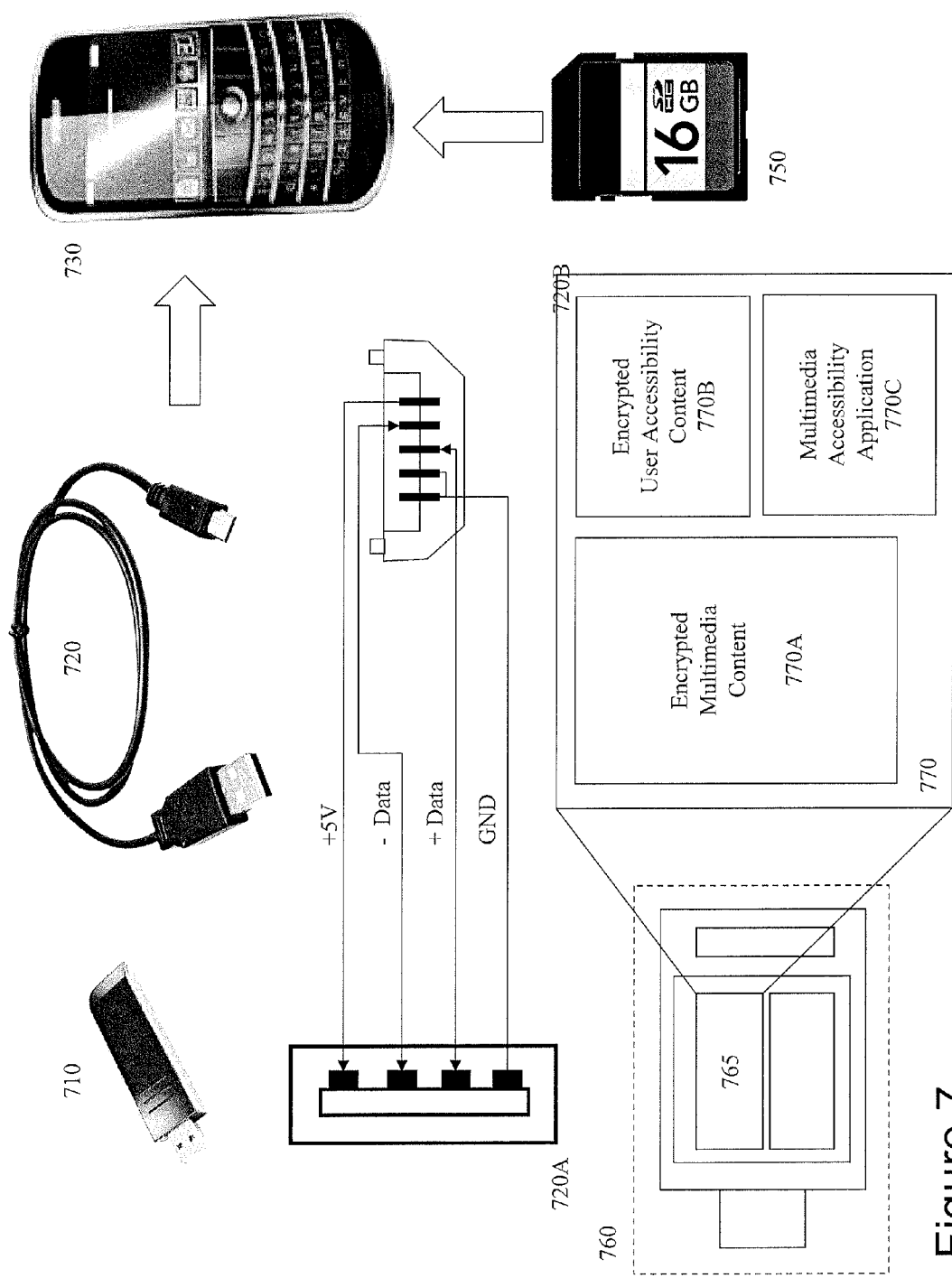
FIG. 7 depicts a memory device and interfacing to a portable electronic device in conjunction with a memory mapping for multimedia content according to an embodiment of the invention.

Referring to FIG. 7 there is shown an interconnection configuration according to an embodiment of the invention between a USB memory device 710, with a Type A connector 720A, to a smartphone 730, with micro-B connector 720B via interface cable 720 wherein the smartphone 730 may retrieve multimedia content from the USB memory device 710. Optionally, the user may insert SD card 750 into the smartphone 730 directly or through an interface such as USB-SD interface 515 depicted above in FIG. 5. As depicted in FIG. 7 USB device 760 contains a flash memory 765 which has stored within a multimedia accessibility application 770C which has been downloaded to the USB device 760 when a user accesses the multimedia content provider system and manages aspects of the user's access to downloaded multimedia content which is stored as encrypted multimedia content 770A within the flash memory 765 together with encrypted user accessibility content 770B.

Partitioning of the SD card 750 may also be structured in a similar manner to contain encrypted multimedia content 770A, encrypted user accessibility content 770B, and multimedia accessibility application 770C. It would be evident to one skilled in the art that optionally the encrypted multimedia content 770A may due to restrictions in overall capacity of USB device 760 be encrypted and stored on multiple portable memory devices which may be concurrently or sequentially interfaced to the PED or FED the user is retrieving the multimedia content upon.

Figure 8:
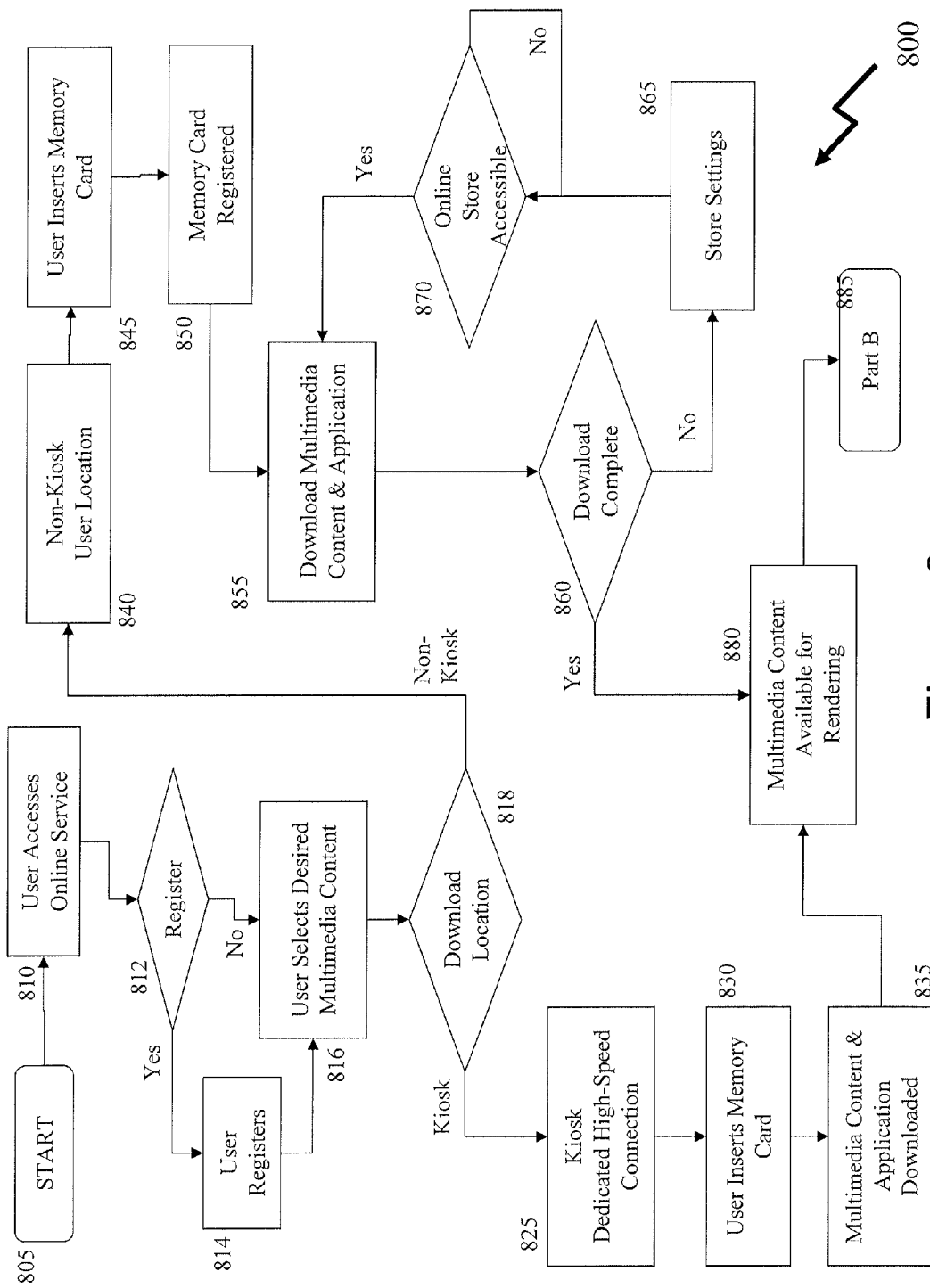
FIG. 8 depicts an exemplary process flow for the accessing and downloading of multimedia content according to an embodiment of the invention.

Referring to FIG. 8 there is depicted a process flow 800 for a user accessing a service providing multimedia content which is downloaded to a portable media storage device. Accordingly the process starts with step 805 and proceeds to step 810 wherein the user accesses the online service and then in step 815 establishes whether they are registered with the service wherein if not the flow proceeds to step 814 and the user registers wherein the flow proceeds to step 816 wherein the user selects the multimedia content they wish to view. If the user was registered with the service then in step 812 they would have entered their user name and password wherein they would have proceeded directly to step 816. Having selected the multimedia content the process proceeds to step 818 wherein the user selects the download means they wish to exploit.

If they are accessing the service from a kiosk then the process moves to step 825 wherein the process exploits a dedicated high speed connection. The user then inserts their memory card into the kiosk in step 830 wherein the flow proceeds to step 835 wherein the multimedia content and the corresponding multimedia application are downloaded wherein the process proceeds to step 880 where the multimedia content is made available for rendering and the process proceeds to Part B in step 885. At step 818 if the user had selected non-kiosk downloading then the process moves to step 840 wherein the user is prompted to insert their memory card into the system from which they are accessing the service provider. At step 850 the memory card is registered and the process proceeds to step 855 wherein the multimedia content and multimedia application are downloaded before proceeding to step 860.

Early termination of the download also results in the process proceeding to step 860 wherein a determination is made as to whether the download was completed or not. If complete the process moves to step 880 wherein the multimedia content is made available for rendering and the process proceeds to Part B in step 885. If at step 860 the download was incomplete the process proceeds to step 865 wherein the settings of the download completed to date are securely stored within the memory card. Subsequently, the multimedia application when inserted into a computer system will execute in conjunction with the computer system to establish whether the online store is accessible in step 870. If not the process temporarily halts and loops back to step 870 but if accessible the process returns to step 855 wherein the download continues. Accordingly the multimedia content may be downloaded to the memory card in multiple stages allowing the user to achieve the downloading in situations such as those of low data rates, intermittent network access, and mobility.

It would be evident to one skilled in the art that within the process flow 800 the multimedia service provider and multimedia application that they provide to the user's portable memory device may enact multiple techniques for multimedia content protection including for example encrypting the downloaded multimedia content with encryption techniques including for example private key encryption, public key encryption, rotating ciphers, symmetric-key cryptography, asymmetric-key cryptography, RSA, DSA, Optimal Asymmetric Encryption Padding (OAEP), elliptic curve cryptography, and other digital rights management techniques including for example Content Scrambling System (CSS), digital watermarking, metadata, fingerprinting, Protected Media Path, Advanced Access Content System (AACS), Marlin DRM, CableCard, Content Protection and Copy Management (DVB-CPCM), Fairplay, OpenMG DRM, Uplay, and SecuROM. Public-key encryption algorithms may include for example Benaloh, Blum-Goldwasser, Cayley-Purser, CEILIDH, Cramer-Shoup, Damgard-Jurik, DH, EPOC, ECDH, ECDSA, EKE, ElGamal (encryption signature scheme), GMR, Goldwasser-Micali, HFE, IES, Lamport, McEliece, Merkle-Hellman, MQV, Naccache-Stern, NTRUEncrypt, NTRUSign, Paillier, Rabin, Okamoto-Uchiyama, Schnorr, Schmidt-Samoa, SPEKE, SRP, STS, three-pass protocol, and XTR. Other proprietary techniques may also be applied.

It would be evident that the multimedia application downloaded alongside the multimedia content may execute a variety of functions including for example controlling access to the multimedia content, managing encryption, communicate with the multimedia service provider systems. For example, rendering of the multimedia content may be prohibited without verification of the multimedia application stored on the memory card in conjunction with data registered concerning the memory card. Alternatively the multimedia application may interact with the memory mapping of the memory card, for example File Allocation Table (FAT), High Performance File System (HPFS), and New Technology File System (NTFS), thereby obfuscating the stored multimedia content.

According to one embodiment of the invention where the multimedia application intercepts communications with the FAT, or its equivalent, of the memory device the FAT is replaced with a null mapping and the FAT is transferred to a secure server such that memory device must be in communication with the secure server in order for the multimedia content to be retrieved and rendered. According to another embodiment of the invention the mapping transferred to a secure server is retrieved only to retrieve the next predetermined amount of data and the mapping data is never stored within non-volatile memory of the memory device or the computer system to which the memory device is connected.

It would be evident to one skilled in the art that the user when establishing the download of multimedia content may elect to establish rendering rights in dependence upon a varying cost based upon the rendering rights. For example, the rendering rights might be a predetermined period of time, a predetermined number of renderings, or a combination thereof. Optionally, wherein the user downloads multiple items of multimedia content, for example a multi-part film series, for example "Lord of the Rings" or "Star Wars"™, or a television series, for example "The Good Wife" or "Top Chef—Just Desserts", different multimedia content may have different time limits that are established automatically, by the user, or a combination thereof.

Optionally, where the user purchases multiple items of multimedia content only the first item is downloaded and the downloading of the second, and subsequent items of content, is determined in dependence upon the rendering of the preceding item of content. Optionally, the same principle may be employed on a single item of multimedia content so that only a predetermined portion of the multimedia content is downloaded with the remainder being downloaded during the rendering process in determination of the progress of the rendering process or the entire multimedia content may be downloaded minus random or predetermined portions which may include for example content itself or a key, code, mapping etc of the multimedia content. Alternatively, the user may elect to purchase outright for a different financial value such that all rendering limitations are removed.

It would also be evident that the user may elect to delay downloading of the multimedia content to a later point in time, for example to the period 1 am-6 am or 10 am-3 pm when Internet usage in a residential neighbourhood for example may be anticipated to be low such that download speeds to the user's system are higher or the telecommunication service providers meters data differently at specific times such as occurs in many areas with utilities such as electricity. Alternatively, the downloading request from the user to the multimedia content service provider may be brokered with the telecommunication service provider such that the telecommunication service provider manages the actual downloading to the memory device which may for example be beneficial wherein the downloading is bandwidth limited through congestion or bandwidth limiting is implemented.

Figure 9:
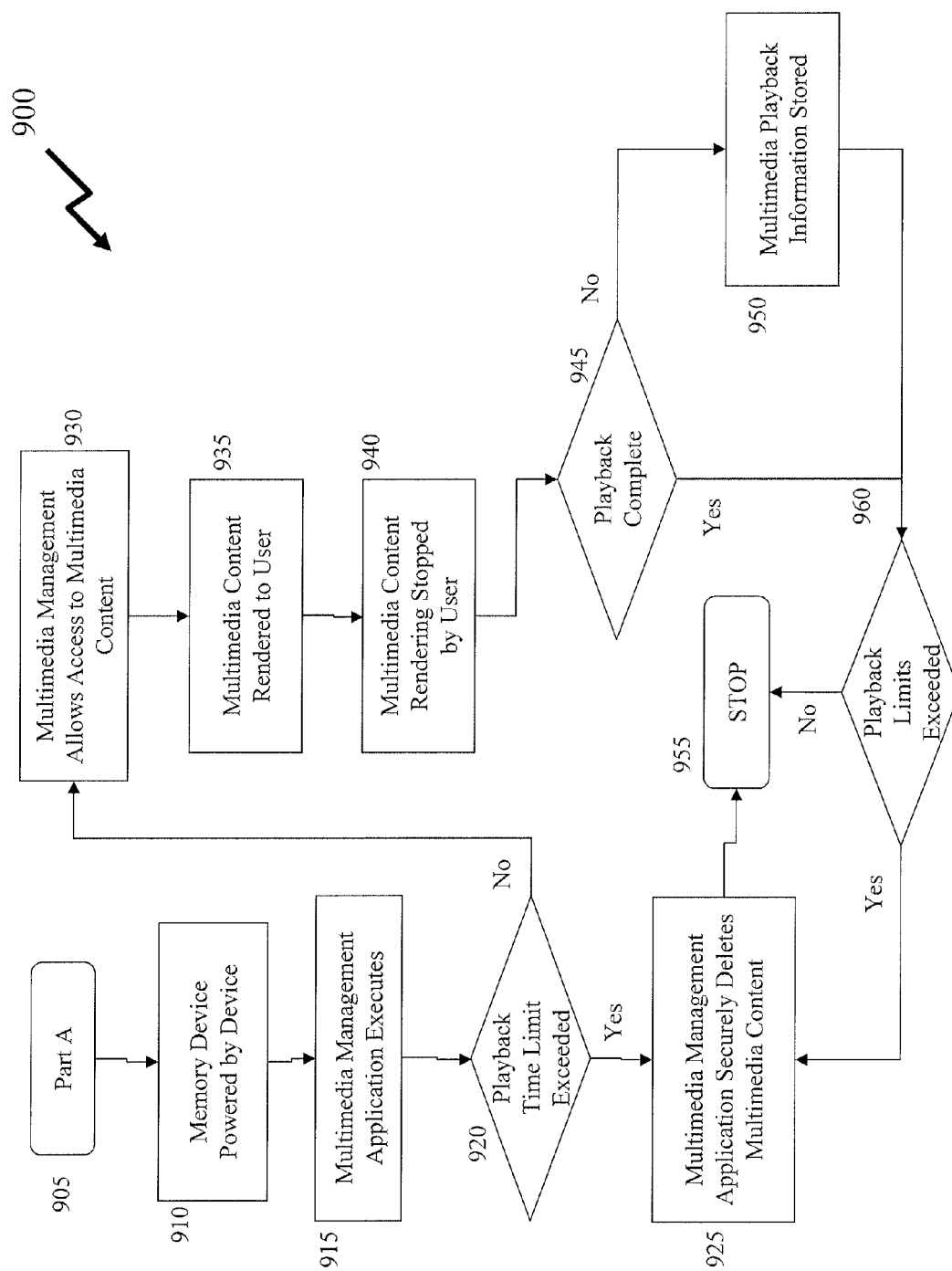
FIG. 9 depicts an exemplary process flow for the rendering of multimedia content according to an embodiment of the invention.

Referring to FIG. 9 the second part of the process flow, Part B, is depicted by process flow 900 which begins with step 905. The process proceeds to step 910 wherein the memory device is powered by a computing device to which it is coupled wherein the multimedia application is accessed by the computer device and executes in step 915. Once executed the multimedia application establishes in step 920 whether the playback time limit for downloaded multimedia content has been exceeded. If yes, then the process proceeds automatically to step 925 wherein the multimedia application securely deletes the multimedia content from the memory device and then proceeds to step 955 and terminates.

If the time limit has not been exceeded the process proceeds to step 930 wherein the multimedia management application allows access to the multimedia content and then is rendered to the user in step 935 before the rendering process is stopped in step 940. In step 945 the multimedia application determines whether the playback is complete wherein if yes the process proceeds to step 960 to determine whether a playback limit has been exceeded, such as for example number of renderings. If the playback is not complete then the process proceeds to step 950 wherein the multimedia playback information is stored and the process moves to step 960. If the determination in step 960 that the playback limit has not been exceeded then the process proceeds to step 955 and stops otherwise it proceeds to step 925 wherein the multimedia content is deleted.

It would be evident to one skilled in the art that secure erasure of the content on the memory device may be made with one of the many software based over-writing algorithms within the prior art or based upon a variant of one or more of these. Optionally, wherein the rendering option selected by the user was a single rendering the secure erasure of the multimedia content may be performed during the actual rendering sequence to the user such that for example content a predetermined period of time prior to the current rendering point may be erased. Alternatively, prior to secure erasure of the multimedia content the user may be offered the chance to extend their rendering rights. Optionally, depending upon the rendering rights established elements of the multimedia content may be erased, for example episode 1 of a series leaving episodes 2 onwards for subsequent rendering.

According to another embodiment of the invention the downloading of the multimedia content may be selected by the user to be made in conjunction with additional elements including for example sub-titles, augmented content, language options, advertising, etc. Such additional elements may be automatically established by the multimedia content provider in dependence upon aspects including, but location of the memory device, user credentials, user demographics, user psychographics, and multimedia content as described below with respect to FIG. 10.

Figure 10:
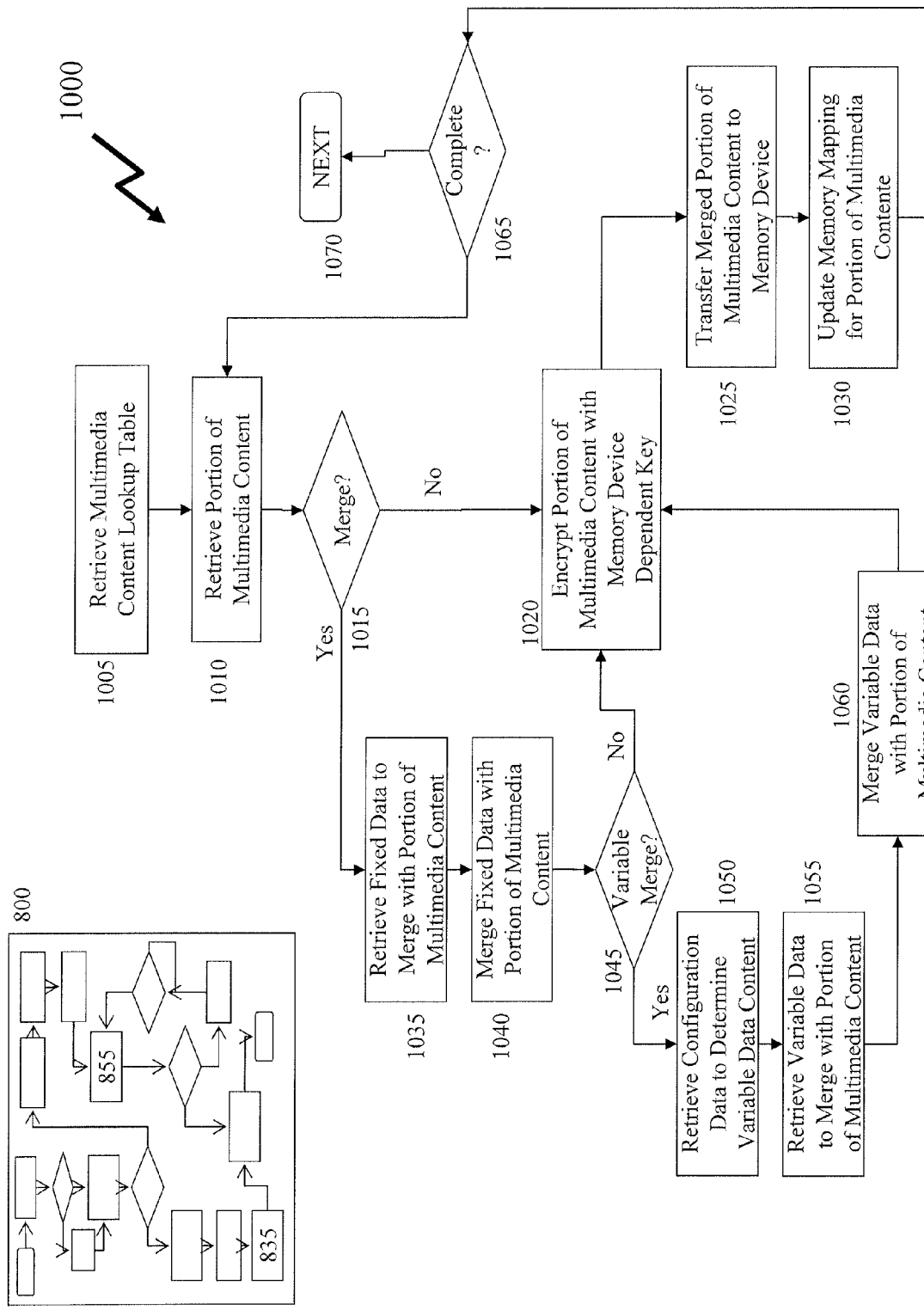
FIG. 10 depicts an exemplary process flow for the generation of the multimedia content to be downloaded and rendered according to an embodiment of the invention.

Referring to FIG. 10 there is depicted a process flow with respect to generating content for downloading such as may occur within an embodiment of the invention in steps 835 and 855 of process flow 800 in FIG. 8 above. Accordingly the process begins at step 1005 wherein the multimedia system at the remote servers of the multimedia service provider retrieves a look-up table of the multimedia content to be transmitted to the user's memory device. This look-up table may be generalized to the multimedia content, modified to the location of the downloading memory device, or specific to the user based upon their purchase of the multimedia content and/or user preferences for example. The process then proceeds to step 1010 wherein the portion of multimedia content is retrieved wherein the process then determines in step 1015 whether a merge process is to be performed. If not the process moves to step 1020 wherein the retrieved portion of the multimedia content is encrypted for transmission with a memory device dependent key thereby locking the content to the memory device as the multimedia application in execution upon the memory device generates the decryption key locally upon execution. The encrypted multimedia content is then transferred in step 1025 to the memory device wherein in step 1030 the memory mapping for the memory device is updated with the information relating to the downloaded encrypted multimedia content. The process then proceeds to step 1065 where the process determines whether the multimedia content download is complete wherein it proceeds to the next step of the overall process in step 1070 if so otherwise the process returns to step 1010 with the retrieval of the next portion of the multimedia content.

If a merge is to be performed as determined in step 1015 then the process proceeds to step 1035 wherein the fixed data for merging with the multimedia content is retrieved and then merged in step 1040 with the multimedia content. Next in step 1045 the process determines whether any variable data is to be merged with the multimedia content wherein if not the process proceeds to step 1020 to encrypt the merged fixed data and multimedia content otherwise it proceeds to step 1050. At step 1050 the process determines what variable data is to be retrieved for merging with the multimedia content, which is then retrieved in step 1055 and merged in step 1060 with the previously combined fixed data and multimedia content. The resulting merged fixed data, variable data, and multimedia content is then encrypted at step 1020.

Accordingly it would be evident to one skilled in the art that fixed data may be determined for example in dependence upon a range of factors including but not limited to licensing rights within particular jurisdictions, advertising rights sold within particular jurisdictions, cultural factors relating to particular jurisdictions etc. The factors determining the variable data may include for the example the time of the multimedia content purchase, i.e. a first advertiser may have purchased September and another October, user preferences such as language for example, and multimedia content rights purchased. It would be evident to one skilled in the art that alternatively the selected multimedia content is downloaded to the memory device with the fixed data either merged or stored separately for dynamic merging on rendering and that the variable data is downloaded to the multimedia device based upon the actual rendering process being initiated by the user.

Optionally both the fixed and variable data may be downloaded when the rendering process, i.e. playback, is initiated. It would also be evident that in instances where the user has selected advertising in order to reduce the cost of the multimedia content that the advertising may be variable data content such that every time the multimedia content is rendered new advertisements are presented to the user. Such advertisements may for example be other multimedia content provided by the multimedia service provider such that these advertisements stay current rather than stale-dating as with prior art physical media distributions such as VHS, Betamax, and DVDs.

Figure 11:
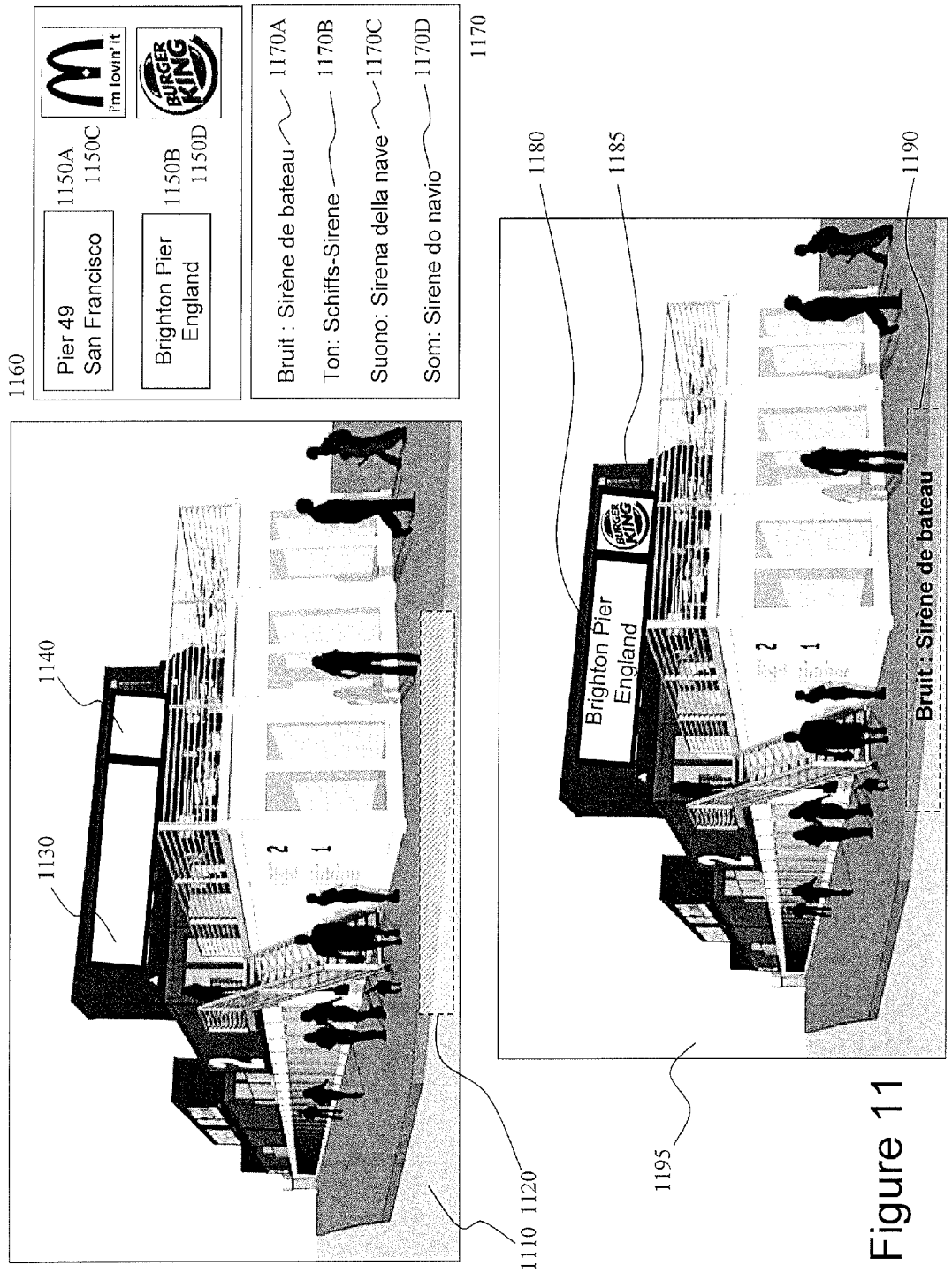
FIG. 11 depicts an example of merging multimedia content with fixed and variable data for providing the combined multimedia content to a user according to an embodiment of the invention.

Now referring to FIG. 11 there is depicted a content merging process relating to multimedia content wherein fixed data 1160, variable data 1170, and multimedia content 1110 are shown prior to merging and post-merging in combined multimedia content 1195. Accordingly multimedia image 1110 presents an image from multimedia content to be presented to a user through rendering wherein first to third regions 1130 through 1150 have been established as containing additional data. First and second regions 1130 and 1140 by elements which always require completion with additional data, to provide the rendered image, whereas third region 1150 is a region optionally completed with additional content, e.g. subtitles. Accordingly, shown adjacent multimedia image 1110 is first data 1160 comprising two locations, "Pier 49 San Francisco" 1160A and "Brighton Pier England" 1160B which represent two options for data to be used to render first region 1130 and first and second logos 1160C and 1160D respectively which represent two options for data to be used in rendering second region 1140.

Also shown is second data 1170 that contains options for third region 1150 which in this instance are translations of sound effects related to the combined multimedia content 1195, i.e. a sound of a ship's siren. Accordingly, third region 1150 relates to content for a user with preferences for audio-assisted multimedia content as they are potentially hard of hearing or deaf or an expected viewer of the multimedia content is. As shown an English sub-title "Sound: Ship Siren" is translated into French, German, Italian and Portuguese in first to fourth sub-titles 1170A through 1170D respectively. In the instance that third region contains sub-titles relating to the translation of speech, singing etc within the multimedia content then it would be evident that the optional rendering of this content as a variable element allows for example a user to purchase the multimedia content within the United States and send the memory device to their mother in Mexico wherein when she plays the multimedia content Spanish sub-titles are retrieved as the location of the rendering system has been established through one of the techniques known within the prior art such as GPS, triangulation and IP address for example. Accordingly, fixed or variable data may be dynamically downloaded upon the request to render the downloaded multimedia content.

Figure 12:
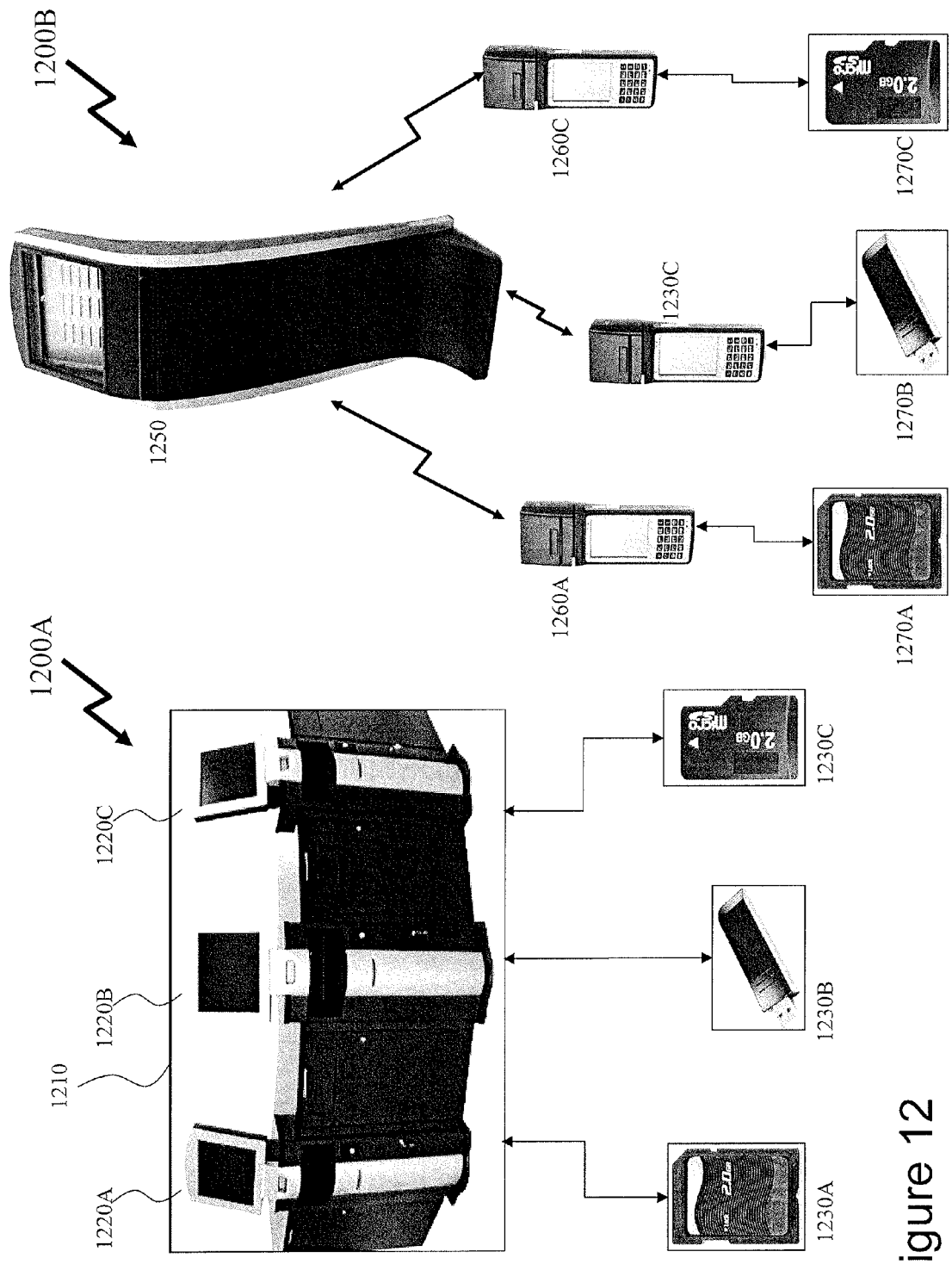
FIG. 12 depicts examples of kiosks according to embodiments of the invention for providing users with multimedia content.

Referring to FIG. 12 there are depicted first and second kiosks 1200A and 1200B. First kiosk 1200A provides a plurality of display devices 1220A to 1220C to different users as part of the kiosk system 1210 allowing them to select multimedia content, provide payment for the digital rights they wish to have and then have the multimedia content downloaded to their memory devices, examples of which may include for example SD card 1230A, USB memory device 1230B, and micro-SD card 1230C. Second kiosk 1200B provides a plurality of handheld devices 1260A through 1260C which interact with the central kiosk 1250 wirelessly allowing each user of a handheld device 1260A through 1260C to select multimedia content, provide payment for the digital rights they wish to have and then have the multimedia content downloaded to their memory devices, examples of which may include for example SD card 1270A, USB memory device 1270B, and micro-SD card 1270C.

The plurality of handheld devices 1260A through 1260C may in this instance interface to the central kiosk through a communications standard such as WiMedia Alliance's Ultra-WideBand (UWB) common radio platform, which is capable of sending 480 Mbit/s at distances up to 3 meters and 110 Mbit/s at up to 10 meters and designed to operate in the 3.1 to 10.6 GHz frequency range in order to not to conflict with common wireless standards within a typical kiosk deployment scenario which would include for example GSM and multiple IEEE 802.11 systems. Accordingly where such kiosks are deployed they may access dedicated high speed communications links to a remote multimedia content service so that users may rapidly download large multimedia content files in very short timeframes. Accordingly such kiosks may be deployed in a wide range of retail and non-retail environments. It would be evident to one skilled in the art that the handheld devices allow for downloading to the user whilst they are within a non-traditional multimedia content purchasing environment such as for example fast food restaurants or coffee shops and the integration of payment interfaces including, but not limited to, magnetic card readers, near-field communications, chip cards, and smart cards.

It would evident to one skilled in the art that the kiosk may store locally multimedia content selected by the multimedia service provider, for example the latest Hollywood movie releases or computer gaming releases. These may be stored in conjunction with part of the multimedia catalog of the multimedia service provider whilst the remainder of the multimedia service providers catalog as well as third party multimedia content may be stored remotely. The split between local content, $C_X$, and remote content, $C_{1-X}$, may be varied in predetermined or dynamic manner wherein $0 \leq X \leq 1$. In this manner the multimedia service provider can provide fast downloads to users at the kiosk of popular content and eliminate the requirements for physical media distribution whilst providing 24 hours a day, 7 days a week, 365 days a year service to customers. Optionally, the kiosk may also monitor user purchases and/or downloads and make a determination regarding whether to add an item of multimedia content should be added to the localized multimedia content so that an item that suddenly becomes popular does not need constant downloads until a determination is made by the multimedia service provider personnel. Further, this allows for regional and local variations to be automatically handled.

Figure 13:
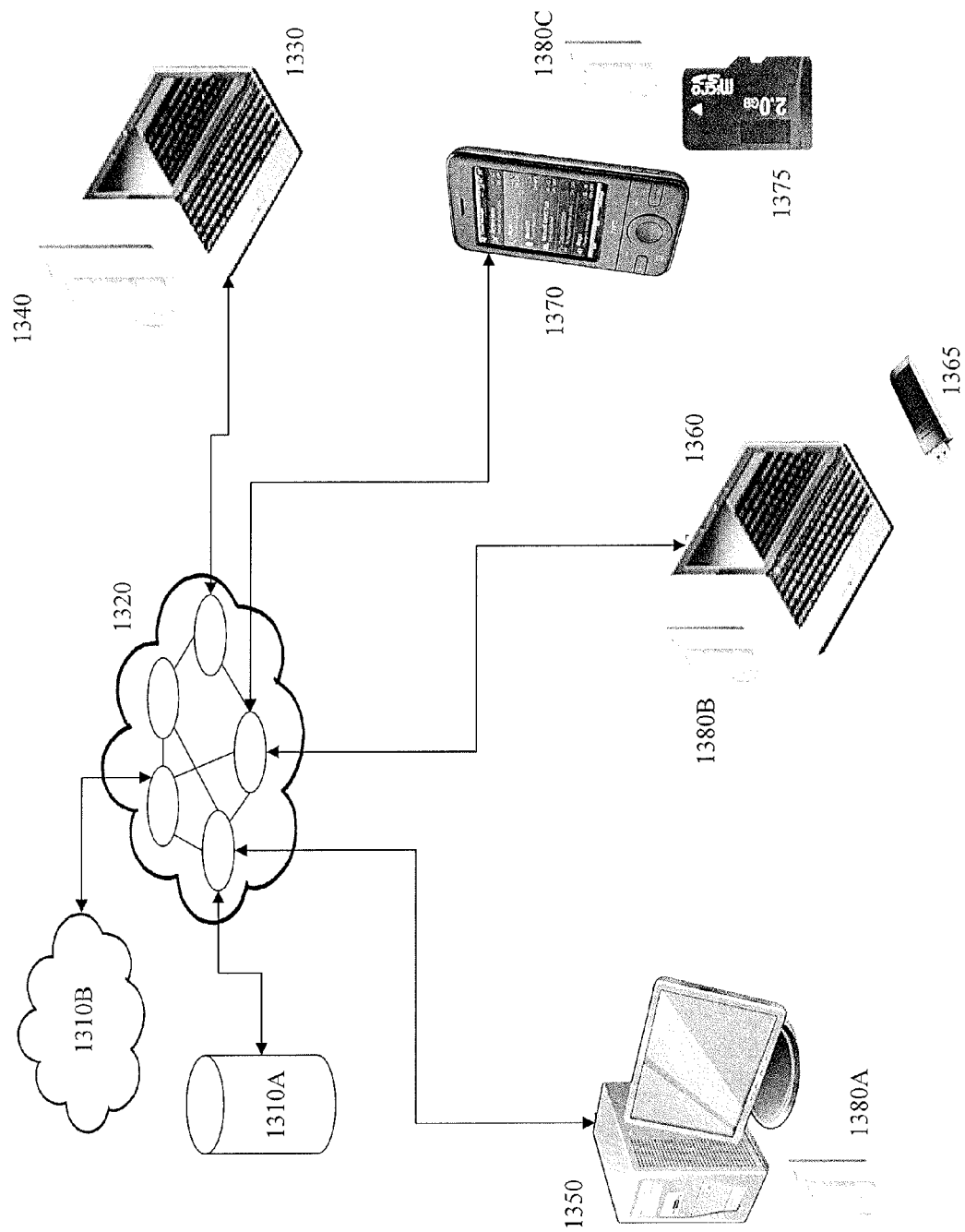
FIG. 13 depicts an embodiment of the invention for the secure distribution of electronic documents.

Now referring to FIG. 13 there is depicted an embodiment of the invention relating to the distribution of electronic documents as part of securing such electronic documents from unauthorized reproduction and distribution. Accordingly a user, not shown for clarity, drafting a document 1340 on their laptop 1330 may lock the document 1340 to the memory of their laptop 1330 during drafting prior to publication. The user may then publish or release their document 1340 for storage, for example to a known remote storage 1310A or to a distributed storage such as so-called "cloud" storage 1310E wherein the multimedia application executing on their laptop 1330 would access the memory of each of the remote storage 1310A and cloud storage 1310B so that the data was stored with an encryption that included the memory identity such that copying of the data to another location would render the content useless.

Similarly, when the user wishes to release the document 1340 they issue notifications to intended recipients, for example by electronic mail, such that the recipient(s) download the document 1340 using a multimedia application so that it is then encrypted and stored according to embodiments of the invention such as described above in respect of FIGS. 2 through 12 respectively. Accordingly as shown first to third recipients, not shown for clarity, download first to third copies 1380A through 1380C respectively to first to third memories 1350, 1365, and 1375 respectively. First memory 1350 forming part of the system within which it is installed, second memory 1365 being a demountable memory device, such as a USB memory stick for example, and third memory 1375 is a demountable memory card, such as a micro-SD card. In this manner each of the first to third copies 1380A through 1380C respectively downloaded to the first to third memories 1350, 1365, and 1375 respectively are encrypted according to identities of the memory devices.

Optionally, other aspects of embodiments of the invention discussed supra in respect of FIGS. 2 through 12 may be employed such that, for example, the user distributing the document maintains on their computer, e.g. laptop 1330, the memory maps of the downloaded copies of the document on the recipients memory devices so that the recipients are unable to access the remotely stored memory map. It would be evident to one skilled in the art that such accessing the remotely stored memory map on a recipients computer system may be controlled through the use of access credentials, user accounts etc so that failure to provide a correct credential renders the data unreadable. Further for enhanced security the storing of the data to the recipients memory device may be based upon the random or pseudo-random section of memory clusters rather than the sequential cluster based writing usually employed.

As the multimedia content rendering rights are configured within embodiments of the invention to the memory device to which the multimedia content is stored such rights may be a single rendering where no time limit is established. It would also be evident that whilst the discussions above have been primarily discussed within the implicit of multimedia content being published to users for rendering such as movies, music, etc it would be evident to one skilled in the art that the approach also applies to the ability of individuals to send multimedia content such as photographs or videos to friends with rendering rights so that they know the content is protected from subsequent release generally. For example an intimate image or video being a couple may be rendered impossible to distribute as the content is encrypted with the memory device of the recipient's smartphone when the content is downloaded. In such instances it would be evident that the multimedia content application rather than being a discrete application downloaded in respect of multimedia content a user wishes to purchase that the application is part of the general operating environment of the PED or FED it forms part of so that all content downloaded of specific formats is encrypted according to methods described in respect of embodiments of the invention to render them secure.

Optionally, therefore for example where a user posts multimedia content to a cloud service and notifies another user that the content exists then the user may limit downloads to 2 times allowing the other user to access and download the multimedia content for example to their home computer and smartphone. Many other variations would be evident to one skilled in the art including for example that the FED to which the memory device is connected is a wireless router such that multiple PEDs/FEDs connected to the wireless router may simultaneously view the multimedia content or sequentially access the multimedia content.

It would be evident to one skilled in the art that in some embodiments of the invention the user may only access multimedia content for downloading and rendering based upon their providing at least a credential relating to them which may include, but not be limited to, a user identity, password, account identifier, personal information, electronic mail address and financial instrument data. In other embodiments of the invention the multimedia content may be downloaded only upon presentation and acceptance of a financial instrument such as a credit card or electronic fund transfer account. Alternatively, the provider may not charge for access to the multimedia content but may provide it free of charge to registered users or users who provide personal information such as a telephone number, address, name, and electronic mail account.

It would also be evident that the downloaded multimedia content may be formatted according to a predetermined standard which in some embodiments may be specific to some electronic devices, e.g. released by Apple, Blackberry, Nokia, Sony-Ericsson for use only on their electronic devices or multimedia distribution platforms such as iTunes™ for example. In other instances the multimedia content may be downloaded with one or more format translators allowing the multimedia content to be rendered on other electronic devices. For example the multimedia content may be provided in MPEG-4 format allowing its rendering on laptop computers, smartphones, cellphones, tablets etc and a translator for converting the MPEG-4 format to Advanced Television Systems Committee (ATSC) standard-definition or high-definition formats for North America and Digital Video Broadcasting (DVB) for Europe.

It would also be evident that in embodiments of the invention that the downloading is secured in dependence upon an identity of the memory device that a user may purchase an item of multimedia content and gift it to another user who then enters the access credentials to the multimedia service provider, by accessing them through an email for example, such that the download is then triggered to the device that the user enters the credentials from thereby allowing gifting of multimedia content. Where the system detects multiple memory devices the user may be given the option of which to download the multimedia content to.

It would also be evident that according to an embodiment of the invention the user may establish a request that relates to the release of multimedia content at a future point in time such as the release of a new movie or show and that such requests may be repetitive as for example in respect of requesting each episode of a series so that the user automatically receives each episode downloaded to a memory device for example wherein the transfer may be prior to the scheduled release through a time lock or subsequently such as between 1 am and 6 am the following morning when cable usage is typically low for example.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one or more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
   storing within a memory device an application relating to stored multimedia content;
   receiving and storing new multimedia content within the memory device comprising:
      receiving new multimedia content for storage within the memory device;
      storing the new multimedia content within the memory device;
      transferring a mapping stored within the memory device of the new multimedia content on the memory device to a computer system; and
      modifying the mapping stored within the memory device relating to the new multimedia content to render it incorrect for any access to the new multimedia content other than via the application; and
   retrieving and rendering the new multimedia content comprising:
      receiving a request to render the new multimedia content;
      transmitting a request for the mapping of the new multimedia content to the computer system;
      retrieving from the computer system a predetermined portion of the mapping relating to a predetermined portion of the new multimedia content; and
      decrypting the predetermined portion of the new multimedia content associated with the predetermined portion of the mapping in dependence upon a decryption key, the decryption key being generated in dependence upon at least the data relating to the memory device and a rendering right associated with the new multimedia content received with the new multimedia content.

2. The method according to claim 1, wherein receiving the new multimedia content further comprises:
   receiving a first predetermined portion of the multimedia content;
   receiving fixed data associated with the first predetermined portion of the multimedia content, the fixed data being established in dependence upon a first characteristic;
   receiving variable data associated with the first predetermined portion of the multimedia content, the variable data being established in dependence upon a second characteristic;
   merging the first predetermined portion of the multimedia content with the fixed data and variable data associated with the first predetermined portion of the multimedia content; and
   encrypting the new multimedia content prior to storing it.

3. The method according to claim 2 wherein,
   at least one of the first characteristic and the second characteristic relates to at least a user associated with the supplied credential, an aspect of the memory device, an aspect of the multimedia content, and an aspect of the copyright owner of the multimedia content.

4. The method according to claim 1, wherein receiving the new multimedia content further comprises:
   receiving a first predetermined portion of the multimedia content;
   receiving fixed data associated with the first predetermined portion of the multimedia content, the fixed data being established in dependence upon a first characteristic;
   receiving variable data associated with the first predetermined portion of the multimedia content, the variable data being established in dependence upon a second characteristic;
   encrypting the new multimedia content prior to storing it; and
   retrieving and rendering the new multimedia content further comprises:
      merging the first predetermined portion of the multimedia content with the fixed data and variable data associated with the first predetermined portion of the multimedia content after decryption prior to rendering it to a user.

5. The method according to claim 4 wherein,
   at least one of the first characteristic and the second characteristic relates to at least a user associated with the supplied credential, an aspect of the memory device, an aspect of the multimedia content, and an aspect of the copyright owner of the multimedia content.

6. One or more non-transitory tangible computer readable media encoding a computer process for execution by a processor, the computer process comprising:
   storing within a memory device comprising the processor an application relating to stored multimedia content;
   receiving and storing new multimedia content within the memory device comprising:
      receiving new multimedia content for storage within the memory device;
      storing the new multimedia content within the memory device;
      transferring a mapping stored within the memory device of the new multimedia content on the memory device to a computer system; and
      modifying the mapping stored within the memory device relating to the new multimedia content to render it incorrect for any access to the new multimedia content other than via the application;
   retrieving and rendering the new multimedia content comprising:
      receiving a request to render the new multimedia content;
      transmitting a request for the mapping of the new multimedia content to the computer system;
      retrieving from the computer system a predetermined portion of the mapping relating to a predetermined portion of the new multimedia content;
      decrypting the predetermined portion of the new multimedia content associated with the predetermined portion of the mapping in dependence upon a decryption key, the decryption key being generated in dependence upon at least the data relating to the memory device and a rendering right associated with the new multimedia content received with the new multimedia content.

7. The one or more non-transitory tangible computer readable media according to claim 6 encoding a computer process for execution by a processor, wherein
   receiving the new multimedia content further comprises:
      receiving a first predetermined portion of the multimedia content;

receiving fixed data associated with the first predetermined portion of the multimedia content, the fixed data being established in dependence upon a first characteristic;

receiving variable data associated with the first predetermined portion of the multimedia content, the variable data being established in dependence upon a second characteristic;

merging the first predetermined portion of the multimedia content with the fixed data and variable data associated with the first predetermined portion of the multimedia content; and encrypting the new multimedia content prior to storing it.

8. The one or more non-transitory tangible computer readable media according to claim 7 encoding a computer process for execution by a processor, wherein at least one of the first characteristic and the second characteristic relates to at least a user associated with the supplied credential, an aspect of the memory device, an aspect of the multimedia content, and an aspect of the copyright owner of the multimedia content.

9. The one or more non-transitory tangible computer readable media according to claim 6 encoding a computer process for execution by a processor, wherein receiving the new multimedia content further comprises:
  receiving a first predetermined portion of the multimedia content;
  receiving fixed data associated with the first predetermined portion of the multimedia content, the fixed data being established in dependence upon a first characteristic;
  receiving variable data associated with the first predetermined portion of the multimedia content, the variable data being established in dependence upon a second characteristic;
  encrypting the new multimedia content prior to storing it; and retrieving and rendering the new multimedia content further comprises:
  merging the first predetermined portion of the multimedia content with the fixed data and variable data associated with the first predetermined portion of the multimedia content after decryption prior to rendering it to a user.

10. The method according to claim 9 wherein,
at least one of the first characteristic and the second characteristic relates to at least a user associated with the supplied credential, an aspect of the memory device, an aspect of the multimedia content, and an aspect of the copyright owner of the multimedia content.

11. A memory device comprising:
a processor and one or more non-transitory tangible computer readable media encoding a plurality of computer processes for execution by the processor, the computer processes comprising:
  a first computer process relating to the storage of multimedia content;
  a second computer process relating to the receipt and storage of new multimedia content within the memory device, the second computer process comprising:
    receiving new multimedia content for storage within the memory device;
    storing the new multimedia content within the memory device;
    transferring a mapping stored within the memory device of the new multimedia content on the memory device to a computer system; and
    modifying the mapping stored within the memory device relating to the new multimedia content to render it incorrect for any access to the new multimedia content other than via the application; and
  a third computer process relating to the retrieval and rendering of new multimedia content, the third computer process comprising:
    receiving a request to render the new multimedia content;
    transmitting a request for the mapping of the new multimedia content to the computer system;
    retrieving from the computer system a predetermined portion of the mapping relating to a predetermined portion of the new multimedia content; and
    decrypting the predetermined portion of the new multimedia content associated with the predetermined portion of the mapping in dependence upon a decryption key, the decryption key being generated in dependence upon at least the data relating to the memory device and a rendering right associated with the new multimedia content received with the new multimedia content.

12. The memory device according to claim 11, wherein receiving the new multimedia content comprises:
  receiving a first predetermined portion of the multimedia content;
  receiving fixed data associated with the first predetermined portion of the multimedia content, the fixed data being established in dependence upon a first characteristic;
  receiving variable data associated with the first predetermined portion of the multimedia content, the variable data being established in dependence upon a second characteristic;
  merging the first predetermined portion of the multimedia content with the fixed data and variable data associated with the first predetermined portion of the multimedia content; and
  encrypting the new multimedia content prior to storing it.

13. The memory device according to claim 12, wherein
at least one of the first characteristic and the second characteristic relates to at least a user associated with the supplied credential, an aspect of the memory device, an aspect of the multimedia content, and an aspect of the copyright owner of the multimedia content.

14. The memory device according to claim 11, wherein receiving the new multimedia content further comprises:
  receiving a first predetermined portion of the multimedia content;
  receiving fixed data associated with the first predetermined portion of the multimedia content, the fixed data being established in dependence upon a first characteristic;
  receiving variable data associated with the first predetermined portion of the multimedia content, the variable data being established in dependence upon a second characteristic;
  encrypting the new multimedia content prior to storing it; and retrieving and rendering the new multimedia content further comprises:
  merging the first predetermined portion of the multimedia content with the fixed data and variable data associated with the first predetermined portion of the multimedia content after decryption prior to rendering it to a user.

15. The memory device according to claim 14, wherein, at least one of the first characteristic and the second characteristic relates to at least a user associated with the supplied credential, an aspect of the memory device, an aspect of the multimedia content, and an aspect of the copyright owner of the multimedia content.

\* \* \* \* \*